United States Patent
Collins

(10) Patent No.: US 9,772,420 B2
(45) Date of Patent: *Sep. 26, 2017

(54) ESTIMATION OF FAST SHEAR AZIMUTH, METHODS AND APPARATUS

(71) Applicant: Halliburton Energy Services, Inc., Houston, TX (US)

(72) Inventor: Mark V. Collins, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 431 days.

This patent is subject to a terminal disclaimer.

(21) Appl. No.: 14/586,623

(22) Filed: Dec. 30, 2014

(65) Prior Publication Data

US 2015/0112596 A1    Apr. 23, 2015

Related U.S. Application Data

(63) Continuation-in-part of application No. 13/878,727, filed as application No. PCT/US2012/052679 on Aug. 28, 2012, now Pat. No. 9,513,396.

(60) Provisional application No. 61/533,620, filed on Sep. 12, 2011, provisional application No. 61/533,420, filed on Sep. 12, 2011.

(51) Int. Cl.
*G01V 3/38* (2006.01)
*G01V 1/52* (2006.01)
*G01V 1/28* (2006.01)

(52) U.S. Cl.
CPC ............. *G01V 1/52* (2013.01); *G01V 1/284* (2013.01); *G01V 2210/626* (2013.01)

(58) Field of Classification Search
CPC ... G01V 1/36; G01V 1/50; G01V 3/28; G01V 2210/67; G01V 2210/27; G01V 2210/1299
USPC ............................................. 702/6, 9, 14, 66
See application file for complete search history.

(56) References Cited

U.S. PATENT DOCUMENTS

| | | |
|---|---|---|
| 4,912,979 A | 4/1990 | Sondergeld et al. |
| 5,278,805 A | 1/1994 | Kimball |
| 5,541,890 A | 7/1996 | Tang |
| 5,712,829 A | 1/1998 | Tang et al. |
| 5,740,124 A | 4/1998 | Chunduru et al. |
| 5,791,899 A | 8/1998 | Sachdeva et al. |
| 5,808,963 A | 9/1998 | Esmersoy |
| 6,098,021 A | 8/2000 | Tang et al. |

(Continued)

FOREIGN PATENT DOCUMENTS

| | | |
|---|---|---|
| WO | WO-2013039687 A1 | 3/2013 |
| WO | WO-2013039690 A1 | 3/2013 |

OTHER PUBLICATIONS

U.S. Appl. No. 14/343,006, filed Mar. 5, 2014, Analytic Estimation Apparatus, Methods, and Systems.

(Continued)

*Primary Examiner* — An Do
(74) *Attorney, Agent, or Firm* — Gilliam IP PLLC

(57) ABSTRACT

Various embodiments include apparatus and methods to operate to record a plurality of acoustic waveforms, to generate an objective function based on the plurality of acoustic waveforms, and to estimate a global minimum of the objective function. The plurality of acoustic waveforms can correspond to a plurality of acoustic dipole receivers azimuthally disposed around a tool to which the receivers are attached. Additional apparatus, systems, and methods are disclosed.

22 Claims, 14 Drawing Sheets

(56) References Cited

U.S. PATENT DOCUMENTS

| | | | |
|---|---|---|---|
| 6,449,560 | B1 | 9/2002 | Kimball |
| 6,568,486 | B1* | 5/2003 | George .................. G01V 1/44 175/45 |
| 6,718,266 | B1 | 4/2004 | Sinha et al. |
| 6,791,899 | B2 | 9/2004 | Blanch et al. |
| 6,826,485 | B1 | 11/2004 | Bale et al. |
| 6,842,400 | B2 | 1/2005 | Blanch et al. |
| 7,295,926 | B2 | 11/2007 | Jeffryes |
| 7,310,285 | B2 | 12/2007 | Donald et al. |
| 7,474,996 | B2 | 1/2009 | Horne et al. |
| 7,623,412 | B2 | 11/2009 | Pabon et al. |
| 8,102,732 | B2 | 1/2012 | Pabon et al. |
| 8,326,539 | B2 | 12/2012 | Morrison et al. |
| 9,069,097 | B2 | 6/2015 | Zhang et al. |
| 9,348,052 | B2 | 5/2016 | Collins et al. |
| 9,513,396 | B2* | 12/2016 | Collins .................. G01V 1/50 |
| 2002/0186895 | A1 | 12/2002 | Gloersen |
| 2004/0158997 | A1 | 8/2004 | Tang |
| 2007/0140055 | A1 | 6/2007 | Tello et al. |
| 2007/0156359 | A1 | 7/2007 | Varsamis et al. |
| 2007/0274155 | A1 | 11/2007 | Ikelle |
| 2008/0319675 | A1 | 12/2008 | Sayers |
| 2009/0185446 | A1 | 7/2009 | Zheng et al. |
| 2010/0020642 | A1 | 1/2010 | Sinha |
| 2010/0034052 | A1 | 2/2010 | Pabon et al. |
| 2010/0309748 | A1 | 12/2010 | Tang et al. |
| 2011/0019501 | A1 | 1/2011 | Market |
| 2014/0195160 | A1 | 7/2014 | Collins et al. |
| 2014/0222346 | A1 | 8/2014 | Collins et al. |

OTHER PUBLICATIONS

U.S. Appl. No. 13/878,727, filed Apr. 10, 2013, Formation Property Determination Apparatus, Methods, and Systems.
"U.S. Appl. No. 13/878,727, Amendment filed May 6, 2016", 9 pgs.
"U.S. Appl. No. 13/878,727, Non Final Office Action dated May 19, 2016", 6 pgs.
"U.S. Appl. No. 13/878,727, Notice of Allowance dated Feb. 10, 2016", 7 pgs.
"U.S. Appl. No. 13/878,727, Preliminary Amendment filed Apr. 10, 2013", 3 pgs.
"U.S. Appl. No. 13/878,727, Response filed Jan. 11, 2016 to Non Final Office Action dated Oct. 2, 2015", 13 pgs.
"U.S. Appl. No. 14/343,006, Notice of Allowance dated Jan. 20, 2016", 8 pgs.
"European Application Serial No. 12831892.0, Office Action dated Nov. 26, 2015", 5 pgs.
"European Application Serial No. 12831892.0, Reply filed Apr. 1, 2016 to Office Action dated Nov. 16, 2015", 13 pgs.
"Australian Application Serial No. 2012309003, Examination Report No. 1 dated Oct. 20, 2014", 3 pgs.
"Australian Application Serial No. 2012309006, Notice of Acceptance dated Feb. 24, 2014", 8 pgs.
"Canadian Application Serial No. 2,848,465, Office Action dated May 15, 2014", 2 pgs.
"Canadian Application Serial No. 2,848,465, Response filed Nov. 11, 2014 to Office Action dated May 15, 2014", 2 pgs.
"European Application Serial No. 12831892.0, Office Action dated Feb. 28, 2014", 3 pgs.
"European Application Serial No. 12831892.0, Response filed Aug. 27, 2014 to Office Action dated Feb. 28, 2014", 13 pgs.
"European Application Serial No. 12832411.8, Office Action dated Apr. 22, 2014", 3 pgs.
"European Application Serial No. 12832411.8, Response filed Oct. 14, 2014 to Official Action dated Apr. 22, 2014", 12 pgs.
"International Application Serial No. PCT/US2012/052658, Search Report dated Nov. 14, 2012", 2 pgs.
"International Application Serial No. PCT/US2012/052658, Written Opinion dated Nov. 3, 2014", 4 pgs.
"International Application Serial No. PCT/US2012/052658, Written Opinion dated Nov. 14, 2012", 6 pgs.
"International Application Serial No. PCT/US2012/052679, International Preliminary Report on Patentability dated Mar. 20, 2014", 5 pgs.
"International Application Serial No. PCT/US2012/052679, Search Report dated Nov. 6, 2012", 2 pgs.
"International Application Serial No. PCT/US2012/052679, Written Opinion dated Nov. 6, 2012", 3 pgs.
Tang, X.-M., et al., "In: vol. 24—Quantitative Borehore Acoustic Methods", Handbook of Geophysical Exploration: Seismic Exploration. Elsevier Ltd., (2004), 159-167.
"Mexican Application Serial No. MX/a/2014/002945, Office Action dated Jan. 15, 2015", (w/ English Summary), 3 pgs.
"U.S. Appl. No. 13/878,727, Corrected Notice of Allowance dated Sep. 6, 2016", 2 pgs.
"U.S. Appl. No. 13/878,727, Notice of Allowance dated Aug. 22, 2016", 7 pgs.
"European Application Serial No. 12832411.8, Response filed Aug. 31, 2016 to Office Action dated May 3, 2016", 23 pgs.
"U.S. Appl. No. 13/878,727, Non Final Office Action dated Oct. 2, 2015", 10 pgs.
"U.S. Appl. No. 14/343,006, Notice of Allowance dated Aug. 27, 2015", 9 pgs.
"U.S. Appl. No. 14/343,006, Notice of Allowance dated Oct. 7, 2015", 8 pgs.
"European Application Serial No. 12831892.0, Response filed Jun. 24, 2015 to Supplementary European Search Report dated Feb. 12, 2015", 17 pgs.

* cited by examiner

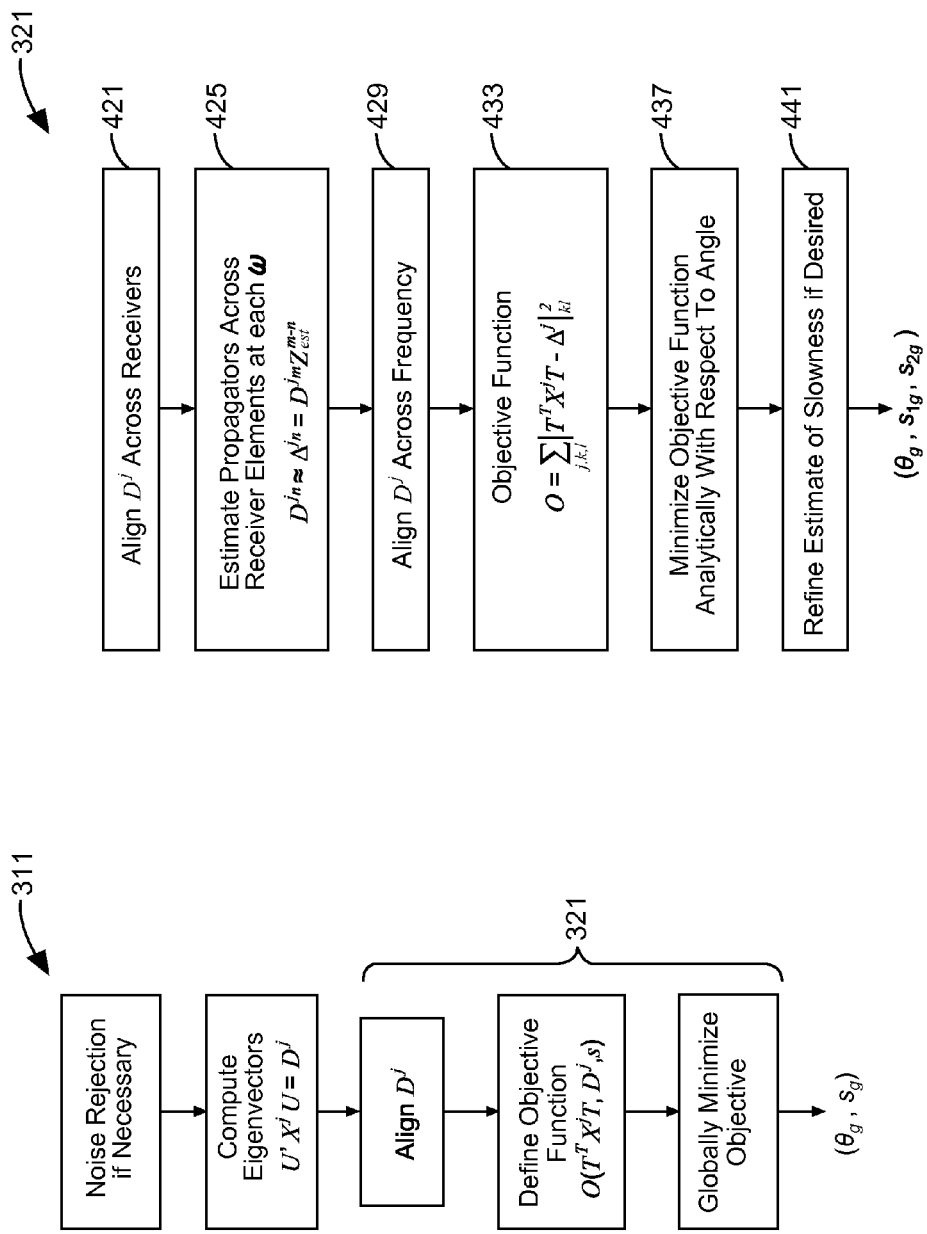

ESTIMATION OF FAST SHEAR AZIMUTH, METHODS AND APPARATUS

RELATED APPLICATION

This application is a continuation-in-part of U.S. application Ser. No. 13/878,727, filed 10 Apr. 2013, which is a U.S. National Stage Filing under 35 U.S.C. 371 from International Application No. PCT/US2012/052679, filed on 28 Aug. 2012, and published as WO 2013/039690 A1 on 21 Mar. 2013, which application claims priority benefit to U.S. Provisional Patent Application Ser. No. 61/533,620, filed 12 Sep. 2011, and to U.S. Provisional Patent Application Ser. No. 61/533,420, filed 12 Sep. 2011, which applications and publication are incorporated herein by reference in their entirety.

BACKGROUND

Conventional algorithms use only numerical searching for anisotropy processing of cross-dipole acoustic waveforms, to minimize an objective function whose parameters are the azimuth angle of the X-dipole transmitter relative to the fast principal flexural wave axis, and a set of auxiliary parameters. The auxiliary parameters are used to characterize the received waveforms as functions of slowness and borehole radius, among others. Sometimes the processing is used to determine the location and amount of stress-induced anisotropy in a geological formation.

BRIEF DESCRIPTION OF THE DRAWINGS

FIG. 3 is a more detailed flow chart illustrating analytic anisotropy processing according to various embodiments of the invention.

FIG. 4 is a more detailed flow chart illustrating eigenvalue alignment according to various embodiments of the invention.

DETAILED DESCRIPTION

Figure 1:
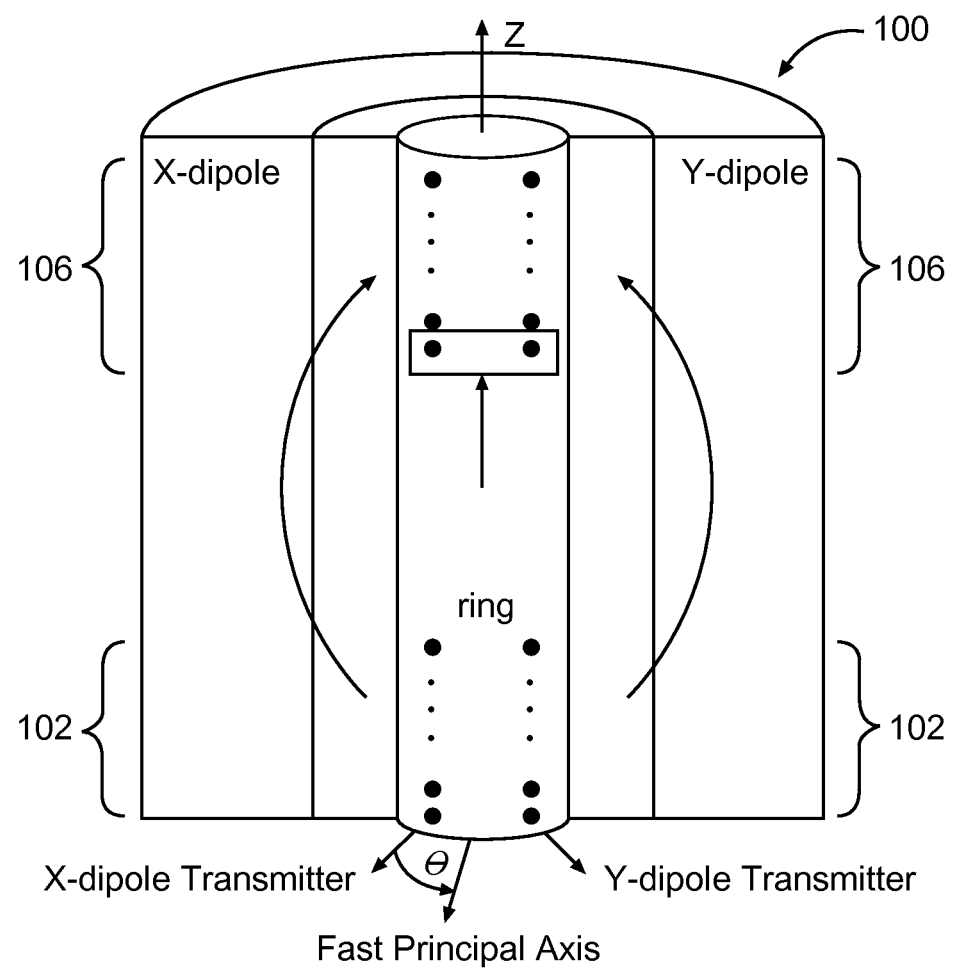
FIG. 1 is an acoustic tool operating according the various embodiments of the invention.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Algorithms for anisotropy processing of cross-dipole acoustic waveforms can operate to minimize an objective function whose parameters are the azimuth angle, $\theta$, of the X-dipole transmitter relative to the fast principal flexural wave axis and a set of auxiliary parameters. The auxiliary parameters are used to characterize the received waveforms as functions of slowness, borehole radius, etc. Minimizing the objective function with respect to all the parameters can provide a desired anisotropy angle. The dependence of the objective function on angle is based on the assumption that the cross-dipole acoustic waveforms obey the Alford rotation equations, i.e. the 2×2 cross-dipole waveform matrix, $X_{kl}$, can be diagonalized by a similarity transformation, $T^T(\theta)XT(\theta)$, using a real 2×2 orthonormal matrix, $T(\theta)$. The objective function measures how well this is accomplished, for example, by minimizing the off-diagonal elements of the similarity transformation with respect to angle.

Embodiments of the invention use the fact that the waveform matrix can be exactly diagonalized by a similarity transformation using a unitary matrix, U. The eigenvalues of the diagonalized matrix are direct estimates of the fast and slow principal waves. Objective functions can then be formed; these functions are dependent upon the eigenvalues, as well as $T(\theta)$ and $X_{kl}$.

When processing cross-dipole acoustic waveform data for anisotropy using the Alford rotation relationship between in-line and cross-line data, the objective function can be minimized with respect to angle and the auxiliary parameters using a numerical search method or brute force. However, using the embodiments described herein it is also possible, using the eigenvalues, to solve for the angles as a function of frequency analytically—without recourse to numerical search methods, which are not guaranteed to find the global minimum, and can be computationally expensive. For example, a 90° jump in angle as a function of frequency can be used as an indicator of stress induced anisotropy.

In the detailed description that follows, it is noted that some of the apparatus and systems discussed herein are well known to those of ordinary skill in the art, and thus, the details of their operation are not disclosed in detail, in the interest of economy and clarity. Those that wish to learn more about these apparatus and systems are encouraged to refer to U.S. Pat. Nos. 4,912,979; 5,712,829; 5,808,963; 6,718,266; 6,791,899; 7,310,285; and 7,623,412; and U.S. Patent Publication Nos. 2009/0185446. Any and all portions of the apparatus, systems, and methods described in each of these documents may be used to realize the various embodiments described herein.

Data Acquisition and Processing

FIG. 1 shows a cross-dipole acoustic tool 100 in a borehole aligned along the z-axis that can be used in conjunction with a method described herein. The tool 100 includes two azimuthally orthogonal dipole-transmitter arrays 102 and two azimuthally orthogonal dipole-receiver arrays 106. Each array has at least one element aligned along the tool axis. Specified in the traditional way, the recorded acoustic waveforms are denoted by in-line components, (XX, YY), and cross-line components, (XY, YX). The first letter refers to the transmitter, and the second letter to the receiver. Thus, for example, the XY recorded waveform is formed by firing the X-directed dipole transmitter and receiving at the Y-directed dipole receiver. The X and Y arrays are aligned along the z-axis such that the m'th element of array X is at the same z-position as the m'th element of array Y and is denoted as ring m. The fast principal wave axis of the formation is directed at angle θ relative to the x-axis. The Alford rotation equation assumes the waveforms transform as a second order tensor. The relationship can be expressed as shown in equation (1) as follows:

$$T^T X^j T = D^j, \quad (1)$$

where $$T(\theta) = \begin{bmatrix} \cos\theta & -\sin\theta \\ \sin\theta & \cos\theta \end{bmatrix} \equiv \begin{bmatrix} c_\theta & -s_\theta \\ s_\theta & c_\theta \end{bmatrix},$$

$$X^j = \begin{bmatrix} XX_j & XY_j \\ YX_j & YY_j \end{bmatrix},$$

and $$D^j = \begin{bmatrix} FP_j & 0 \\ 0 & SP_j \end{bmatrix}.$$

The real orthonormal matrix, $T(\theta)$, describes the Alford rotation, $XX_j, YY_j, XY_j$, and $YX_j$ are the in-line and cross-line waveforms from transmitter ring m to receiver ring n, and j represents a data point j={m,n,t or ω}. $FP_j$ and $SP_j$ are the fast and slow principal waves. The fast principal axis is at angle θ relative to the x-axis. Written explicitly, the elements of equation (1) are:

$$(1,1) \Rightarrow c_\theta^2 XX_j + s_\theta^2 YY_j + s_\theta c_\theta (XY_j + YX_j) = FP_j,$$

$$(2,2) \Rightarrow c_\theta^2 YY_j + s_\theta^2 XX_j - s_\theta c_\theta (XY_j + YX_j) = SP_j,$$

$$(1,2) \Rightarrow c_\theta^2 XY_j - s_\theta^2 YX_j - s_\theta c_\theta (XX_j - YY_j) = 0,$$

$$(2,1) \Rightarrow c_\theta^2 YX_j - s_\theta^2 XY_j - s_\theta c_\theta (XX_j - YY_j) = 0. \quad (2)$$

Note these equations are approximate; in general there does not exist a matrix, $T(\theta)$, that exactly diagonalizes the cross-dipole data. However, in a similar vein, one can always find a unitary matrix, U, that exactly diagonalizes the cross-dipole data. The corresponding eigenvalues are direct estimates of the fast and slow principal flexural waves, $$U^*X^j U = D^j, \quad (3)$$

where $$D^j = \begin{bmatrix} D_{11}^j & 0 \\ 0 & D_{22}^j \end{bmatrix} \approx \begin{bmatrix} FP_j & 0 \\ 0 & SP_j \end{bmatrix}. \quad (4)$$

Processing Methods

Figure 2:
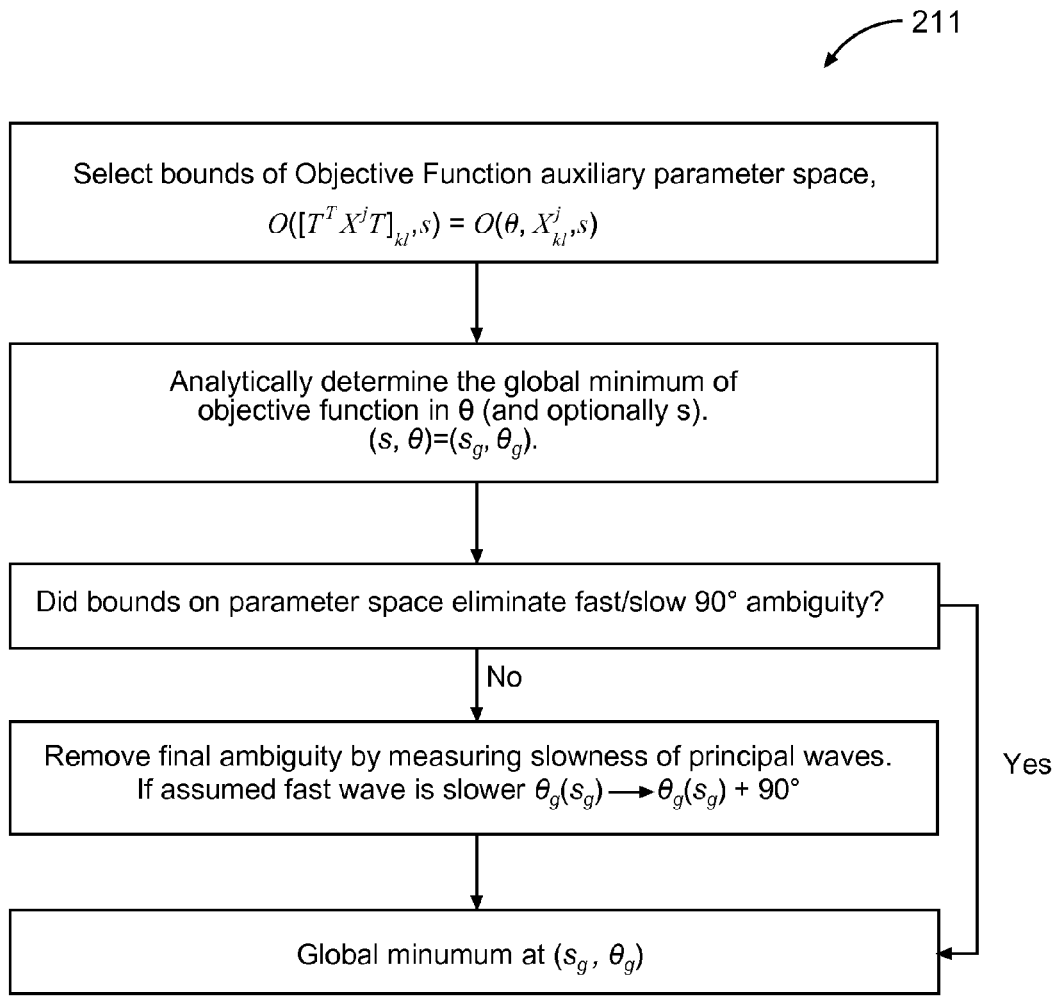
FIG. 2 is a flow chart illustrating anisotropy processing according to various embodiments of the invention.

FIG. 2 is a flow chart illustrating anisotropy processing according to various embodiments of the invention. The anisotropy algorithm 211 can be used to solve for the angle θ by defining an objective function, $O([T^T X^j T]_{kl}, s)$, and minimizing the objective function with respect to (θ, s), where s is an auxiliary parameter space that defines the stacking of the points, j, used in the objective function and/or models the waveforms, $X^j$. Generally, s includes at least a slowness parameter, but may include other parameters such as borehole radius and formation density. The minimization is done using analytical methods, as described in more detail below. Often there are two minima in angle separated by 90°, corresponding to the fast and slow principal axis, which are to be resolved.

(a) A More Detailed Algorithm

FIG. 3 is a more detailed flow chart illustrating analytic anisotropy processing according to various embodiments of the invention. Instead of starting with an objective function formulated from the elements of equation (2), the more detailed algorithm in FIG. 3 uses an objective function formulated from the elements of equation (2) and the eigenvalues from the unitary transformation of equation (3). The algorithm 311 thus starts with implementing an optional noise rejection algorithm, after which the eigenvalues and unitary matrices are computed for each of the points in the data space j={m, n,t or ω}. Noise rejection processing of acquired acoustic waveform data can be accomplished in many different ways, well-known to those of ordinary skill in the art.

The waveforms can be represented in either the frequency or time domains. Note that the unitary transformation is not unique. The columns of U and the corresponding eigenvalues can be swapped so that the (1,1) element of D corresponds to the slow principal wave instead of the fast principal wave. Thus, the eigenvalues from different data points should be aligned relative to one another before they can be used in the objective function. After alignment, the objective function is globally minimized with respect to the angle and auxiliary parameters to determine the angle of the fast anisotropy axis and slowness of the principal waves.

A more detailed embodiment of blocks 321 in FIG. 3 is shown in FIG. 4, to illustrate eigenvalue alignment according to various embodiments of the invention.

(b) Alignment of Eigenvalues Across Receivers (Block 421)

Note there is a 180° symmetry in equation (2), but replacing θ→θ+90° exchanges the eigenvalues and eigenvectors. Since U is almost real and orthonormal, we can align the eigenvalues across receivers as shown below, assuming one transmitter ring and N receiver rings.

The following definition may be employed:

$$u_n = U_{11}(j_n) + iU_{21}(j_n), \quad (5)$$

where n is the receiver ring index, and a waveform data point is specified by $j_n$={n,t or ω}. In addition, the following definition may also be employed:

$$\theta_n = \text{angle}(u_1^* u_n), n=2, \ldots, N. \quad (6)$$

The eigenvalues can be aligned relative to one another across receiver ring by exchanging the eigenvalues of receiver ring n>1 if $$(45° \le \theta_n < 135°) | (-135° < \theta_n < -45°). \quad (7)$$

(c) Estimate of Eigenvalue Propagators (Block 425)

After aligning eigenvalues with respect to receiver rings, it is possible to estimate propagators from receiver ring to receiver ring at a given frequency. Assuming the acoustic tool is substantially centered and only the fast and slow principal flexural waves are present, one can represent the eigenvalues as:

$$D_{kk}^{j_n} \approx A_k(\omega) z_k^{-n}(\omega), \quad z_k = e^{i\omega s_k d}, \tag{8}$$

As of yet it has not been determined which slowness value, $s_1$ or $s_2$, corresponds to the fast principal wave. According to equation (8), a frequency semblance algorithm can be used to determine the propagator, $Z_{est}$.

One embodiment makes use of the equation (9), as follows:

$$z_k = \frac{\sum_{n=1}^{N-1} (D_{kk}^{j_{n+1}})^* D_{kk}^{j_n}}{\sum_{n=1}^{N-1} (D_{kk}^{j_{n+1}})^* D_{kk}^{j_{n+1}}}, \tag{9}$$

where $$Z_{est}(\omega) = \begin{bmatrix} z_1(\omega) & \\ & z_2(\omega) \end{bmatrix}. \tag{10}$$

Note that using the eigenvalues directly makes it unnecessary to do a numerical search in slowness or angle to minimize the objective function if the minimization in the angle is done analytically. Also note that the propagator measures the slowness across the receiver array. The average slowness from transmitter to first receiver is absorbed in the amplitudes, $A_k(\omega)$. Thus this method intrinsically provides depth resolution equal to the receiver array length.

(d) Alignment of Eigenvalues Across Frequency (Block 429)

After computing the propagator, alignment across frequency can be accomplished to determine whether the first eigenvalue corresponds to the fast principal wave, or the slow principal wave. Assume the objective function is defined over a bandwidth $\Delta\omega$ starting at frequency $\omega_{ST}$. Typically the bandwidth will be narrow, because it is useful to detect in-situ stress by solving for the angle as a function of $\omega_{ST}$ by computing the relative phase of the propagators as follows:

$$\Omega(\omega) = \mathrm{angle}(z_1(\omega)^* z_2(\omega)), \quad \omega_{ST} \le \omega \le \omega_{ST} + \Delta\omega. \tag{11}$$

The eigenvalues are aligned across frequency by comparing the phase. If $\mathrm{sign}(\Omega(\omega)) \ne \mathrm{sign}(\Omega(\omega_{ST}))$, the diagonal elements of D and $Z_{est}$ at $\omega$ are exchanged. If $\mathrm{sign}(\Omega(\omega_{ST})) > 0$, then the first eigenvalue corresponds to the fast principal wave; otherwise it corresponds to the slow principal wave. By tracking $\mathrm{sign}(\Omega(\omega_{ST}))$ as a function of $\omega_{ST}$ the eigenvalues can be aligned across the frequency spectrum as well. Then a 90° jump in angle can be used to indicate stress induced anisotropy.

(e) The Objective Function (Block 433)

Having aligned the waveforms, the objective function can be defined. The objective function can be chosen to simplify the analytic estimation of angle. In this case, the objective function is defined as $$O(\theta) \equiv \sum_{\substack{j_n=(\omega,n) \\ j_m=(\omega,m) \\ k,l=1,2}}^{B(\omega_{ST},\Delta\omega)} |T^T X^{j_n} T - D^{j_m} Z_{est}^{m-n}|_{kl}^2. \tag{12}$$

When minimized over angle, this objective function will operate to determine the best real orthonormal $T(\theta)$ that fits the waveforms to the eigenvalues. As the process continues, it is mathematically expedient to change the notation as shown in equation (13):

$$O(\theta) \equiv \sum_{\substack{j=\{j_n,j_m\} \\ k,l=1,2}}^{B(\omega_{ST},\Delta\omega)} |T^T X^j T - \Delta^j|_{kl}^2, \tag{13}$$

where $$\Delta^j \equiv D^{j_m} Z_{est}^{m-n},$$

$$X^j = X^{j_n} \forall j_m. \tag{14}$$

(f) Analytic Minimization of the Angle (Block 437)

Due to the choice of objective function, minimization with respect to angle is greatly simplified. The result is shown in equation (14):

$$\tan(2\theta) = \frac{\mathrm{Re}[\vec{a}^* \cdot \vec{d}]}{\mathrm{Re}[\vec{b}^* \cdot \vec{d}]}, \tag{14}$$

where the vectors are defined as:

$$a^j = X_{12}{}^j + X_{21}{}^j,$$

$$b^j = X_{22}{}^j - X_{11}{}^j,$$

$$d^j = \Delta_{22}{}^j - \Delta_{11}{}^j. \tag{15}$$

Solving equation (14) gives two possible global minimization angles separated by 90°. They are substituted into equation (13) to determine the true global minimum, $\theta_g(\omega_{ST})$.

Figure 9:
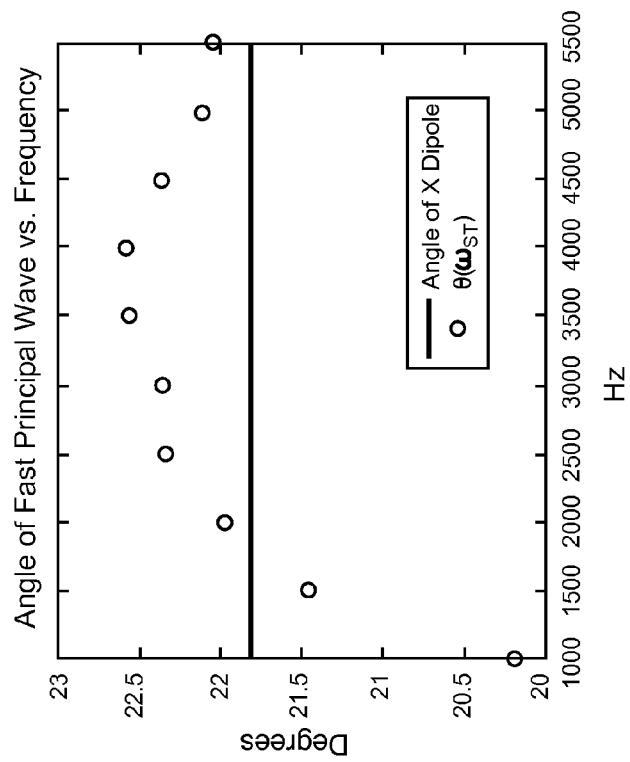
FIG. 9 is a graph of the angle of the fast principal wave vs. frequency according to various embodiments of the invention.

FIG. 9 shows the angle of the fast principal wave as a function frequency for a synthetic crossed dipole. Here, the X-dipole is oriented at 21.8° relative to the fast principal wave axis. The data in this case was generated using a spatially constant elasticity matrix, so there is no 90° jump.

(g) Refinement of Slowness Estimates (Block 441)

Returning now to FIG. 4, at block 441, it is noted that slowness estimates can be refined by rotating the waveforms using $\theta_g(\omega)$ into the fast and slow principal waves using equation (2). A frequency semblance algorithm can be used to detect slowness.

Figure 10:
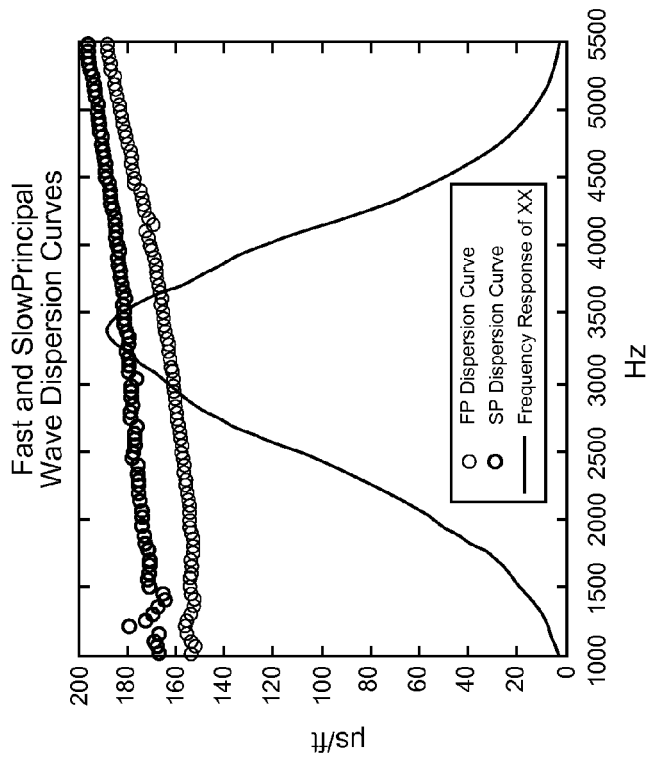
FIG. 10 is a graph of the fast and slow principal wave dispersion curves according to various embodiments of the invention.

FIG. 10 shows the frequency dispersion curves for the same synthetic waveforms computed using a matrix pencil algorithm: a computationally efficient method that can be used for estimating signal parameters, which is well-known to those of ordinary skill in the art. In this case, it is seen that the fast wave has a slowness of about 155 μs/ft., and the slow wave has a slowness of about 175 μs/ft.

Additional Features

Previous solutions to the problem of estimating anisotropy minimize the objective function using a numerical search. The proposed approach uses the eigenvalues derived from a unitary similarity transformation as estimates of the fast and slow principal waves. These estimates can then be used in the objective function as well as the components of equation (2). This makes the objective function more robust, so that it is possible to minimize the objective function analytically.

The ability to detect stress induced anisotropy is a useful aspect of formation evaluation and can be a governing factor in the optimization of the development of a reservoir. Conventional software measures anisotropy using a numerical search or brute force minimization of an objective function in the time or frequency domain. When operating in the time domain the objective function uses the early arrivals of the cross-dipole waveforms over a narrow time interval. After solving for the angle of anisotropy, the fast and slow principal waves are generated using equation (2). Individual depths are analyzed for the presence of stress induced anisotropy by plotting an overlay of the fast and slow dispersion curves. Visual inspection of the dispersion curves for a cross-over in slowness is indicative of stress induced anisotropy. If there is no cross-over, then the anisotropy may be due to some other cause, such as intrinsic anisotropy.

Visual inspection by the operator of two very similar and sometimes noisy dispersion curves can be impractical for processing an entire well bore log, so that individual depths are only spot-checked.

Frequency domain embodiments using the aligned eigenvalues have the advantage of directly measuring the angle as a function of frequency. Stress induced anisotropy is detected by a jump of approximately 90° in the angle as a function of frequency, providing a more reliable indicator that is more amenable to automation than conventional methods. Some embodiments shown herein also provide a depth resolution approximately equal to the receiver array length.

Figure 11:
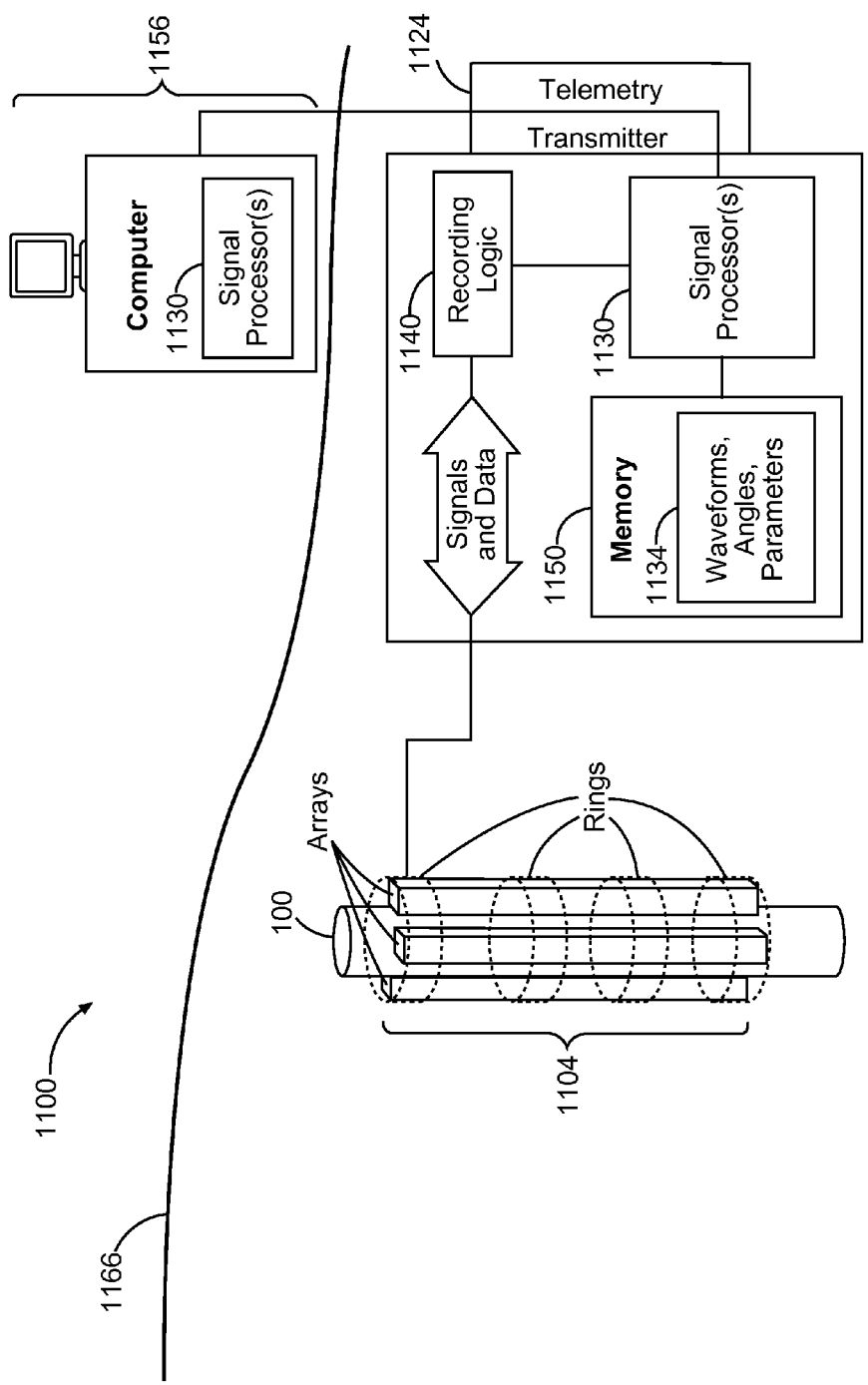
FIG. 11 is a block diagram of an apparatus according to various embodiments of the invention.

FIG. 11 is a block diagram of an apparatus 1100, according to various embodiments of the invention. The apparatus 1100 may comprise a number of components, including those described in the following paragraphs.

For example, an apparatus 1100 may comprise a set of receiver and transmitter arrays 1104, recording logic 1140, and one or more signal processors 1130. The arrays 1104 may be configured as azimuthally orthogonal dipole receiver arrays and azimuthally orthogonal transmitter arrays, attached to a down hole tool, similar to or identical to the tool 100 shown in FIG. 1. The logic 1140 may be configured to record a plurality of acoustic waveforms corresponding to acoustic waves received at the azimuthally orthogonal dipole receiver arrays, the waves being generated by the azimuthally orthogonal transmitter arrays.

The signal processor 1130 may be configured to estimate a global minimum of an objective function with respect to an azimuth angle and a set (possibly null) of auxiliary parameters, wherein the azimuth angle corresponds to an orientation of the transmitter arrays and the receiver arrays relative to fast and slow principal flexural wave axes. The signal processor 1130 may be further configured to estimate fast and slow principal flexural waves propagating along the axes and characterized by the waveforms as ordered complex eigenvalues of a waveform matrix diagonalized by a unitary similarity transformation at each data point of the waveforms, and the objective function depending on the waveforms (which may comprise cross-dipole waveforms), the ordered eigenvalues, the azimuth angle, and (optionally) the set of auxiliary parameters. The signal processor may also be configured to remove existing ambiguities associated with the fast and slow principal flexural wave axes.

The apparatus 1100 may further comprise a memory 1150 to receive and store values 1134 associated with the global minimum of the objective function, such as values corresponding to the azimuth angle and the auxiliary parameters at the global minimum. In various embodiments, the apparatus may comprise a telemetry transmitter 1124 to communicate values associated with the global minimum of the objective function, to include at least the azimuth angle, to a logging facility 1156 at the surface 1166. The logging facility 1156 may include the signal processor 1130.

In the apparatus 1100, the signal processor 1130 may be located at the surface, or be at least partially housed by the downhole tool 100. The surface facility may comprise a display (see element 496 of FIGS. 5, 6) to display various elements of the acquired waveform data, the azimuth angle, the global minimum of the objective function, formation properties, and formation anisotropy information.

Figure 5:
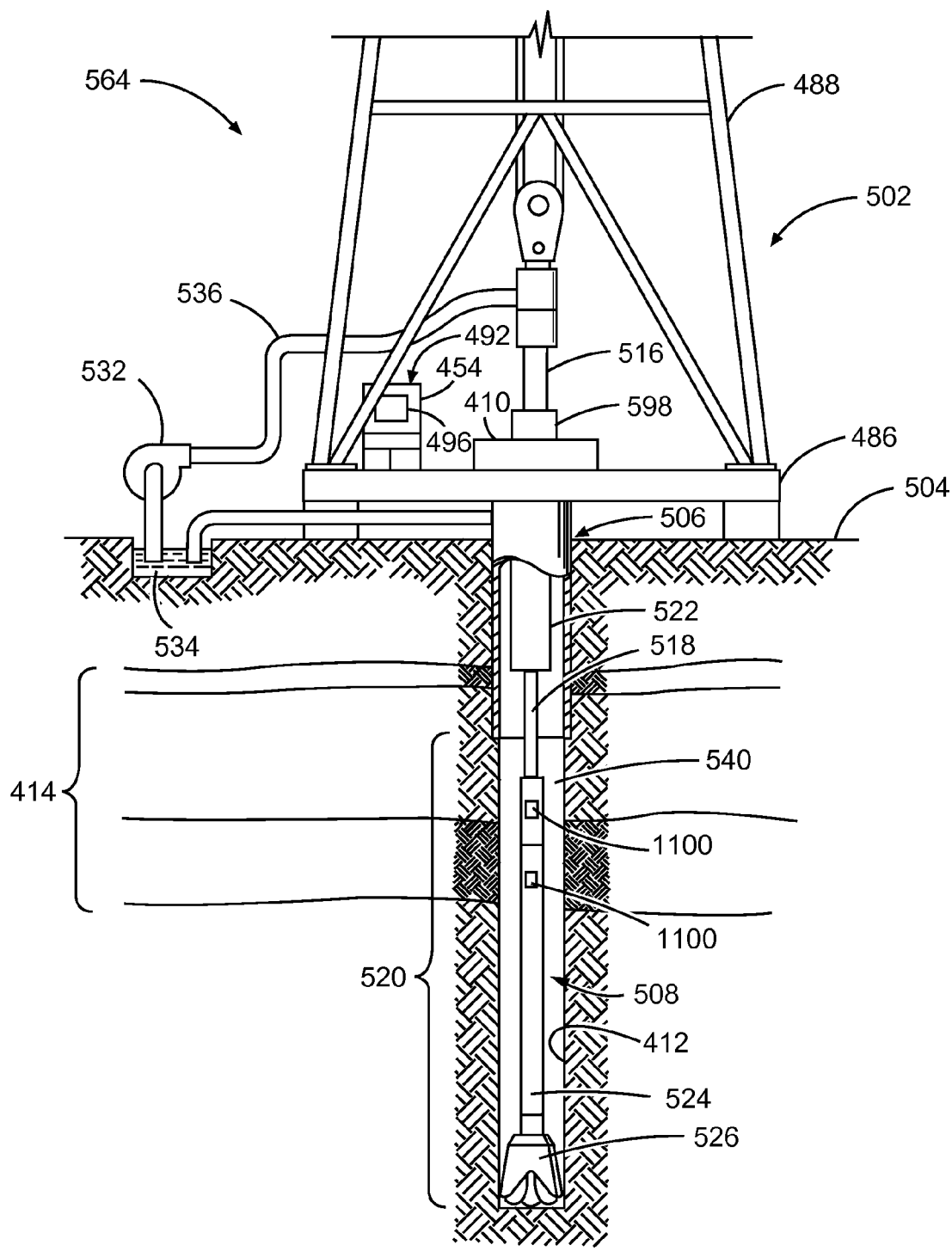
FIGS. 5-6 illustrate system embodiments of the invention.
Figure 6:
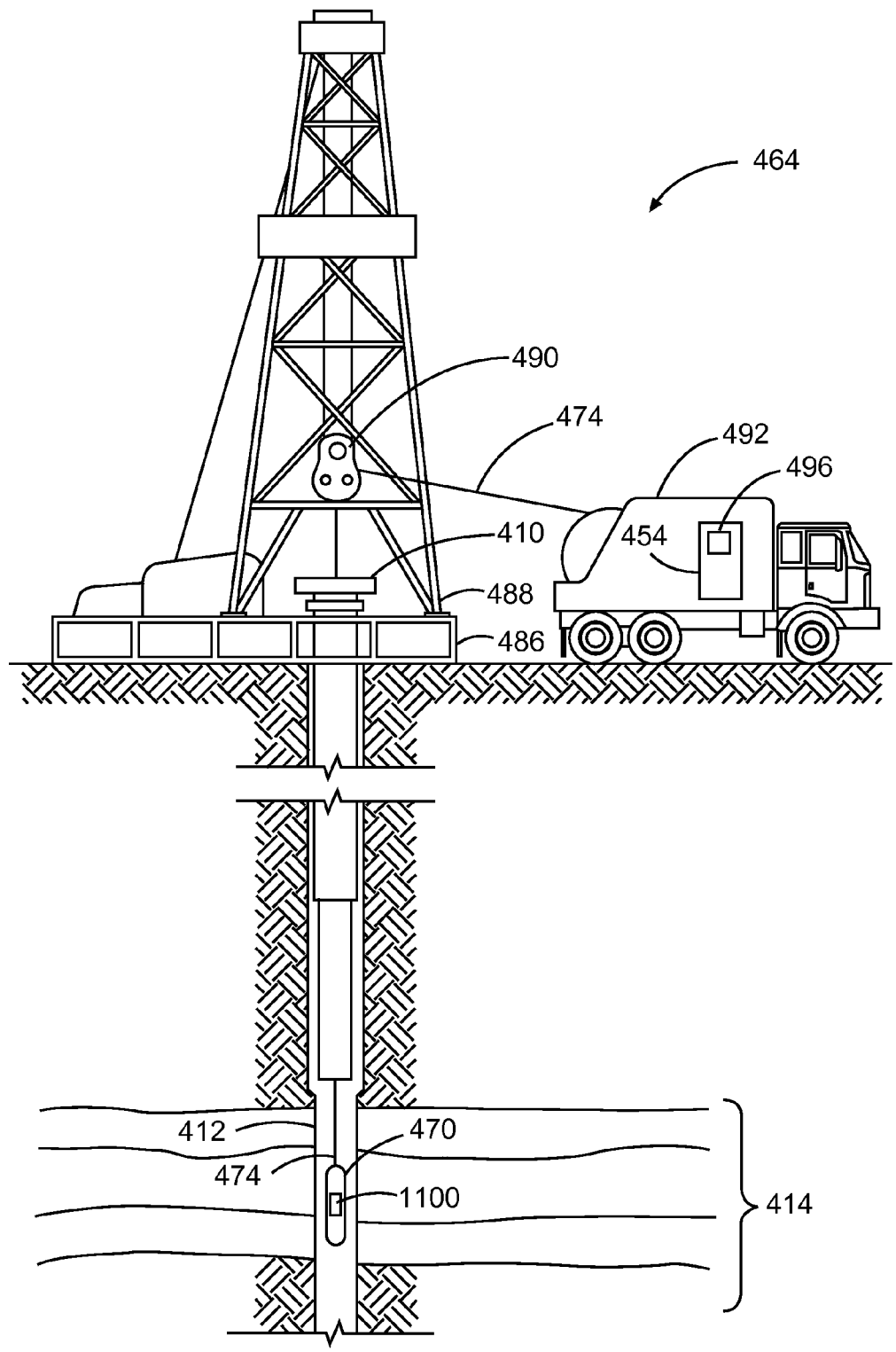

FIGS. 5-6 illustrate system embodiments of the invention. For example, FIG. 5 illustrates a drilling rig system 564 embodiment of the invention, and FIG. 6 illustrates a wireline system 464 embodiment of the invention. Thus, systems 464, 564 may comprise portions of a tool body 470 as part of a wireline logging operation, or of a downhole tool 524 as part of a downhole drilling operation.

Drilling of oil and gas wells is commonly carried out using a string of drill pipes connected together so as to form a drilling string that is lowered through a rotary table 410 into a wellbore or borehole 412. Turning now to FIG. 5, it can be seen how a system 564 may form a portion of a drilling rig 502 located at the surface 504 of a well 506. The drilling rig 502 may provide support for a drill string 508. The drill string 508 may operate to penetrate a rotary table 410 for drilling a borehole 412 through subsurface formations 414. The drill string 508 may include a Kelly 516, drill pipe 518, and a bottom hole assembly 520, which can be located at the lower portion of the drill pipe 518. In various embodiments, apparatus 1100 may be carried as part of the drill string 508 or the downhole tool 524.

The bottom hole assembly 520 may include drill collars 522, a downhole tool 524, and a drill bit 526. The drill bit 526 may operate to create a borehole 412 by penetrating the surface 504 and subsurface formations 414. The downhole tool 524 may comprise any of a number of different types of tools including MWD (measurement while drilling) tools, LWD tools, and others.

During drilling operations, the drill string 508, which can include the Kelly 516, the drill pipe 518, and the bottom hole assembly 520, may be rotated by the rotary table 410. In addition to, or alternatively, the bottom hole assembly 520 may also be rotated by a motor (e.g., a mud motor) that is located downhole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In various embodiments, the drilling fluid can be used to cool the drill bit 526, as well as to provide lubrication for the drill bit 526 during drilling operations. Additionally, the drilling fluid may be used to remove subsurface formation 414 cuttings created by operating the drill bit 526.

FIG. 6 shows a well during wireline logging operations. A drilling platform 486 is equipped with a derrick 480 that supports a hoist 490. Here it is assumed that the drilling string has been temporarily removed from the borehole 412 to allow a wireline logging tool body 470, such as a probe or sonde that carries a sonic tool, to be lowered by wireline or logging cable 474 into the borehole 412. Typically, the tool body 470 is lowered to the bottom of the region of interest and subsequently pulled upward at a substantially constant speed.

During the upward trip, apparatus 1100 included in the tool body 470 may be used to perform measurements in the borehole 412 as they pass by. The measurement data can be communicated to a surface logging facility 492 for storage, processing, and analysis. The logging facility 492 may be provided with electronic equipment for various types of signal processing, which may be implemented by any one or more of the components of the apparatus 1100 shown in FIG. 11. The log data is similar to that which may be gathered and analyzed during drilling operations (e.g., during logging while drilling (LWD) operations).

The boreholes 110; 412; apparatus 300; logging facility 492; display 396; rotary table 410; formation 414; systems 464, 564; tool body 470; drilling platform 486; derrick 480; hoist 490; logging cable 474; drilling rig 502; well 506; drill string 508; Kelly 516; drill pipe 518; bottom hole assembly 520; drill collars 522; downhole tool 524; drill bit 526; mud pump 532; mud pit 534; and hose 536 may all be characterized as "modules" herein. Such modules may include hardware circuitry, and/or a processor and/or memory circuits, software program modules and objects, and/or firmware, and combinations thereof, as desired by the architect of the apparatus 1100 and systems 464, 564, and as appropriate for particular implementations of various embodiments. For example, in various embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for drilling operations, and thus, various embodiments are not to be so limited. The illustrations of apparatus 1100 and systems 464, 564 are intended to provide a general understanding of the structure of various embodiments, and they are not intended to serve as a complete description of all the elements and features of apparatus and systems that might make use of the structures described herein.

Applications that may incorporate the novel apparatus and systems of various embodiments include a variety of electronic systems, such as televisions, cellular telephones, personal computers, workstations, radios, video players, vehicles, and location technology (e.g., GPS (Global Positioning System) location technology), signal processing for geothermal tools and smart transducer interface node telemetry systems, among others. Various embodiments include a number of methods.

Thus, a system 464, 564 may comprise a down hole tool and one or more apparatus 1100, as described previously. The downhole tool may comprise a wireline tool or a measurement while drilling tool, among others. In various embodiments, the azimuthally orthogonal dipole receiver arrays and azimuthally orthogonal transmitter arrays, as part of the apparatus, are each attached to the down hole tool. The recording logic, as part of the apparatus, may be attached to the tool, or form part of a surface computer. Similarly, the signal processor, as part of the apparatus, may also be attached to the tool, or form part of a surface computer. Thus, the signal processor can be attached to the tool and the results of estimating the global minimum of the objective function can be sent to the surface, or the signal processor can operate entirely on the surface. In this way, signal processing that is not completed down hole may be completed at the surface. Telemetry data obtained from the recording logic may be used in the processing at the surface. Various embodiments include a number of methods.

Figure 7:
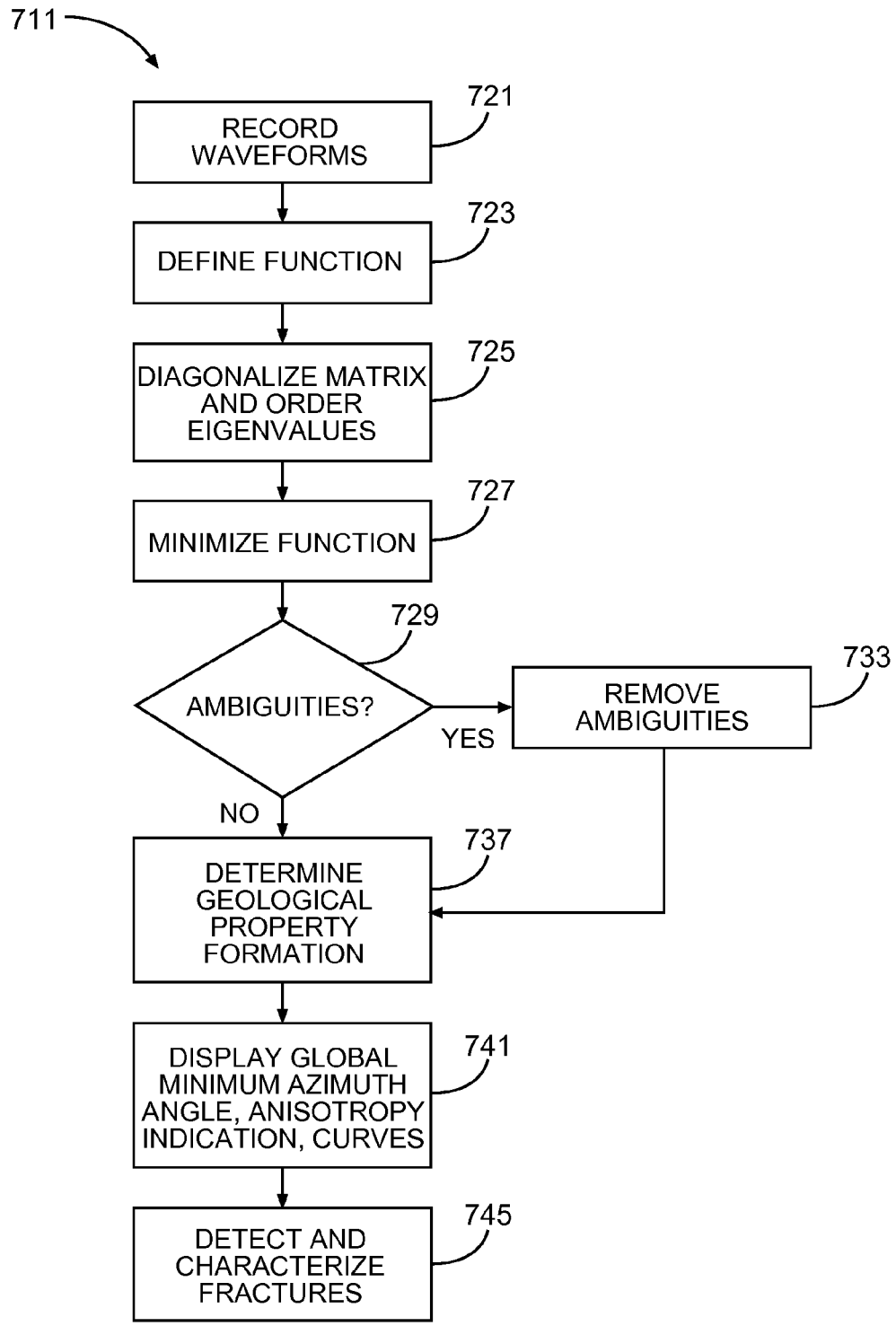
FIG. 7 is a flow chart illustrating several methods according to various embodiments of the invention.

FIG. 7 is a flow chart illustrating several methods according to various embodiments of the invention. For example, a processor-implemented method 711 to execute on one or more processors that perform methods to estimate an azimuth angle and to determine geological formation properties may comprise: recording a plurality of acoustic waveforms comprising cross-dipole waveforms and corresponding to acoustic waves received at azimuthally orthogonal dipole receiver arrays surrounded by a geological formation, the waves being generated by azimuthally orthogonal dipole transmitter arrays, wherein fast and slow principal flexural waves characterized by the waveforms are estimated as the ordered complex eigenvalues of a waveform matrix diagonalized by a unitary similarity transformation at each data point of the waveforms; defining an objective function dependent on the cross-dipole waveforms, the eigenvalues, an azimuth angle corresponding to an orientation of the transmitter and receiver arrays relative to fast and slow principal wave axes, and a set (possibly null) of auxiliary parameters; minimizing the objective function with respect to said angle and the set of auxiliary parameters; and determining at least one property of the geological formation based on the global minimum.

In various embodiments, a processor-implemented method 711 of estimating an azimuth angle, to execute on one or more processors that perform the method, comprises: at block 721, recording a plurality of acoustic waveforms corresponding to acoustic waves received at azimuthally orthogonal dipole receiver arrays surrounded by a geological formation, the waves being generated by azimuthally orthogonal transmitter arrays, the azimuth angle corresponding to an orientation of the receiver arrays and the transmitter arrays relative to fast and slow principal flexural wave axes, wherein fast and slow principal flexural waves propagating along the axes and characterized by the waveforms being estimated as the ordered (optionally complex) eigenvalues of a waveform matrix diagonalized by a unitary similarity transformation; at block 723, defining an objective function dependent on the waveforms (which may comprise cross-dipole waveforms), the ordered eigenvalues, the azimuth angle, and (optionally) a set of auxiliary parameters; at block 727, minimizing the objective function with respect to the azimuth angle (and optionally, the set of auxiliary parameters); and at block 737, determining at least one anisotropy angle of the geological formation based on the global minimum.

The matrix represents a set of data points in a space defined by receiver ring index position and time. The matrix may comprise a cross-dipole waveform matrix. The matrix may also represent a set of data points in a space defined by receiver ring index position and frequency.

The method 711 may further comprise, at block 725, diagonalizing the waveform matrix by a unitary similarity transformation at each data point of the waveforms, by computing a unitary matrix having columns comprising complex eigenvectors of the waveform matrix at each of the data points of the waveforms; and computing the eigenvalues of the eigenvectors.

Analytical or numerical methods (e.g., the Matlab® software "eig" function) may be used to diagonalize the matrix.

Thus, diagonalizing the waveform matrix is accomplished using an analytical method or a numerical method.

In various embodiments, the method 711 may comprise, at block 725: ordering the eigenvalues by ordering eigenvectors and corresponding ones of the eigenvalues across data points of the waveforms such that a difference in angle between the eigenvectors across the data points is minimized, and (optionally) ordering the eigenvectors and the corresponding ones of the eigenvalues across the data points using a parameter correlated in a known way with the difference in the angle.

In various embodiments, the method 711 may comprise, at block 725: ordering eigenvectors and corresponding ones of the eigenvalues across receiver rings at each frequency in a space defined by data points in the waveforms; estimating eigenvalue propagators across the receiver rings from the ordered (across the receiver rings) eigenvalues at each frequency in the space; and ordering the eigenvectors, the corresponding ones of the eigenvalues, and the propagators over frequency by comparing relative phases associated with the estimates of the eigenvalue propagators at one frequency to relative phases associated with the estimates of the eigenvalue propagators at another frequency.

Ordering eigenvectors and eigenvalues as described above is relevant to waveforms in the frequency domain. When the waveforms are in the time domain, eigenvalue alignment is possible but more difficult due to the oscillatory nature of the waveforms. Various time domain embodiments described herein only use the cross-dipole waveforms in the objective function and not the eigenvalues found from a unitary transformation of the cross-dipole waveforms. Use of the eigenvalues in the objective function is optional in either the time or frequency domain and is not meant to limit embodiments taught herein.

In various embodiments, the objective function is defined by utilizing all combinations of receiver rings by estimating eigenvalues at receiver ring index m from application of estimated propagators to eigenvalues at receiver ring index n. When the waveforms are in the time domain an embodiment utilizing all combinations of receiver rings comprises shifting the waveforms according to their receiver ring index by using the auxiliary parameter slowness values.

Minimizing the objective function may be accomplished analytically or by using a numerical search algorithm. Minimizing the objective function may also be accomplished by estimating eigenvalue propagators from the eigenvalues, without minimizing the objective function over a set of auxiliary parameters.

The method of not minimizing the objective function over a set of auxiliary parameters is used in an embodiment that takes advantage of a frequency domain approach, with propagator estimates. In other embodiments that operate in either the time or frequency domain, the objective function is often minimized over a set of auxiliary parameters.

In various embodiments, determining at least one anisotropy angle of the geological formation comprises: implementing the activities described previously for a data point space defined by multiple frequency bands having different starting frequencies or by multiple different time periods having different starting times.

In various embodiments, depending on the form of the objective function and constraints on auxiliary slowness parameters, adding 90° or 45° (modulo 180°) to the anisotropy angle estimated for the one of the bands or time periods to resolve a min/max ambiguity or a fast/slow ambiguity may be necessary. Multiple examples are shown later to illustrate this.

In various embodiments, ordering the eigenvectors and corresponding ones of the eigenvalues comprises switching the corresponding ones of the eigenvalues, and the propagators.

In various embodiments, the method 711 comprises, at block 733 (if objective function min/max or fast/slow axes ambiguities are determined to exist at block 729), removing fast/slow ambiguities or min/max ambiguities as exemplified in the various embodiments.

Various embodiments of the method 711 comprise, at block 741, displaying the global minimum in conjunction with at least one anisotropy angle.

Various embodiments of the method 711 comprise, at block 741, displaying an indication of stress induced anisotropy when an estimated version of the azimuth angle exhibits approximately a 90° jump as a function of start frequency, and dispersion curves for fast and slow principal flexural waves propagating along the axes, wherein the dispersion curves are created from the estimated version of the azimuth angle and the waveforms at each one of the start frequencies.

Various embodiments of the method 711 comprise, at block 745, detecting and characterizing formation fractures and/or a formation ambient stress field, based on the at least one anisotropy angle and an absolute orientation of a down hole tool carrying the transmitter arrays and the receiver arrays.

Additional activities forming a part of the methods 711 are listed in the activities for methods claimed below, and described above with respect to FIGS. 1-6 and 8-11. Thus, it should be noted that the methods described herein do not have to be executed in the order described, or in any particular order. Moreover, various activities described with respect to the methods identified herein can be executed in iterative, serial, or parallel fashion. Some activities may be added, and some of the included activities may be left out. Information, including parameters, commands, operands, and other data, can be sent and received in the form of one or more carrier waves.

Figure 8:
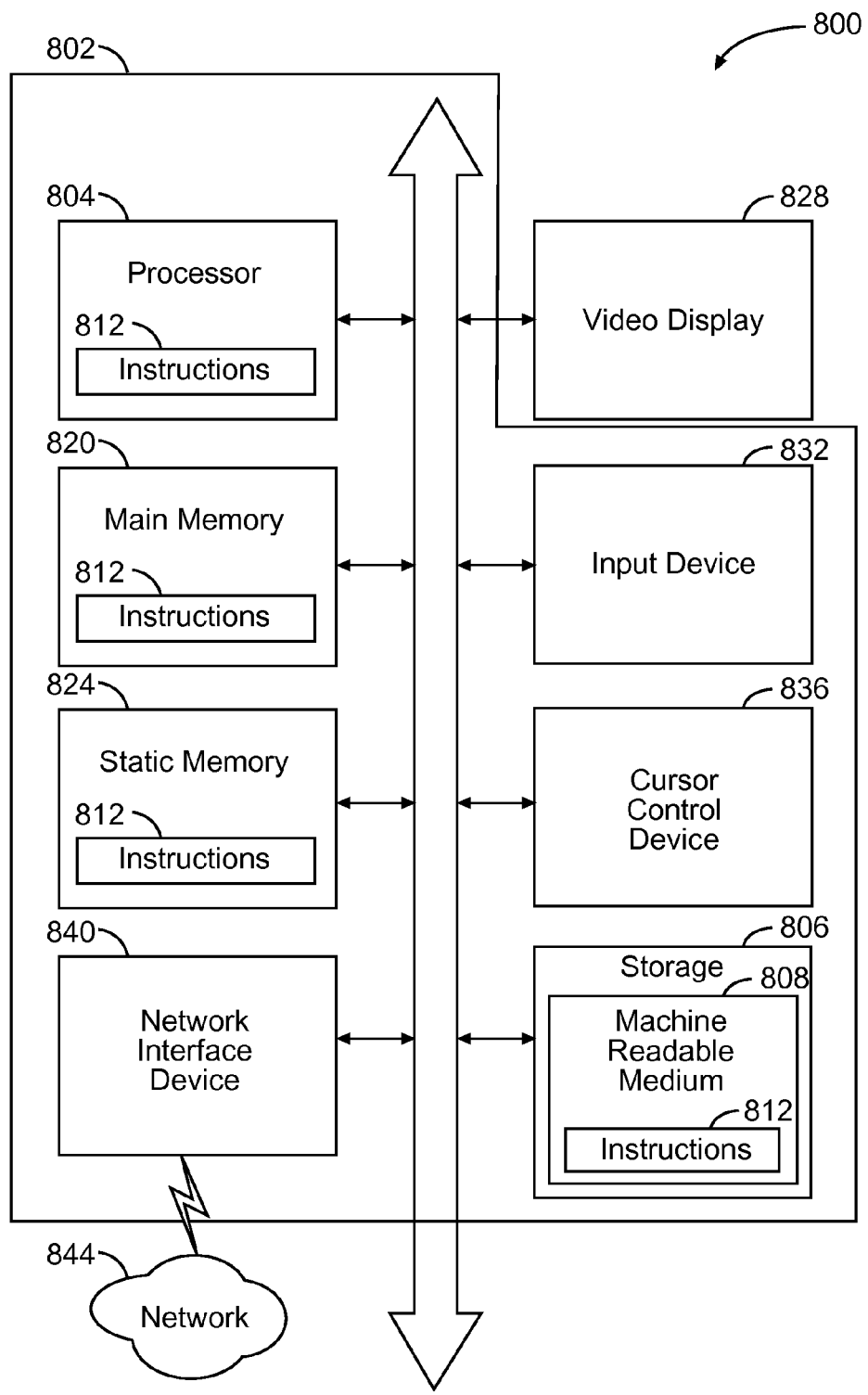
FIG. 8 is a block diagram of an article according to various embodiments of the invention.

FIG. 8 is a block diagram of an article 800 of manufacture, including a specific machine 802, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. In various embodiments, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 800 of manufacture, such as a computer, a memory system, a magnetic or optical disk, some other storage device, and/or any type of electronic device or system may include one or more processors 804 coupled to a machine-readable medium 808 such as a memory (e.g., removable storage media, as well as any memory including an electrical, optical, or electromagnetic conductor comprising non-transitory, tangible media) having instructions 812 stored thereon (e.g., computer program instructions), which when executed by the one or more processors 804 result in the machine 802 performing any of the actions described with respect to the methods above.

The machine 802 may take the form of a specific computer system having a processor 804 coupled to a number of components directly, and/or using a bus 816. Thus, the machine 802 may be similar to or identical to the workstation 454 shown in FIGS. 5 and 6, or the processor in the apparatus 1100 of FIG. 11.

Turning now to FIG. 8, it can be seen that the components of the machine 802 may include main memory 820, static or non-volatile memory 824, and mass storage 806. Other components coupled to the processor 804 may include an input device 832, such as a keyboard, or a cursor control device 836, such as a mouse. An output device 828, such as a video display, may be located apart from the machine 802 (as shown), or made as an integral part of the machine 802.

A network interface device 840 to couple the processor 804 and other components to a network 844 may also be coupled to the bus 816. The instructions 812 may be transmitted or received over the network 844 via the network interface device 840 utilizing any one of a number of well-known transfer protocols (e.g., HyperText Transfer Protocol). Any of these elements coupled to the bus 816 may be absent, present singly, or present in plural numbers, depending on the specific embodiment to be realized.

The processor 804, the memories 820, 824, and the storage device 806 may each include instructions 812 which, when executed, cause the machine 802 to perform any one or more of the methods described herein. In various embodiments, the machine 802 operates as a standalone device or may be connected (e.g., networked) to other machines. In a networked environment, the machine 802 may operate in the capacity of a server or a client machine in server-client network environment, or as a peer machine in a peer-to-peer (or distributed) network environment.

The machine 802 may comprise a personal computer (PC), a workstation, a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 802 is illustrated, the term "machine" shall also be taken to include any collection of machines that individually or jointly execute a set (or multiple sets) of instructions to perform any one or more of the methodologies discussed herein.

While the machine-readable medium 808 is shown as a single medium, the term "machine-readable medium" should be taken to include a single medium or multiple media (e.g., a centralized or distributed database, and/or associated caches and servers, and or a variety of storage media, such as the registers of the processor 804, memories 820, 824, and the storage device 806 that store the one or more sets of instructions 812. The term "machine-readable medium" shall also be taken to include any medium that is capable of storing, encoding or carrying a set of instructions for execution by the machine and that cause the machine 802 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Figure 12:
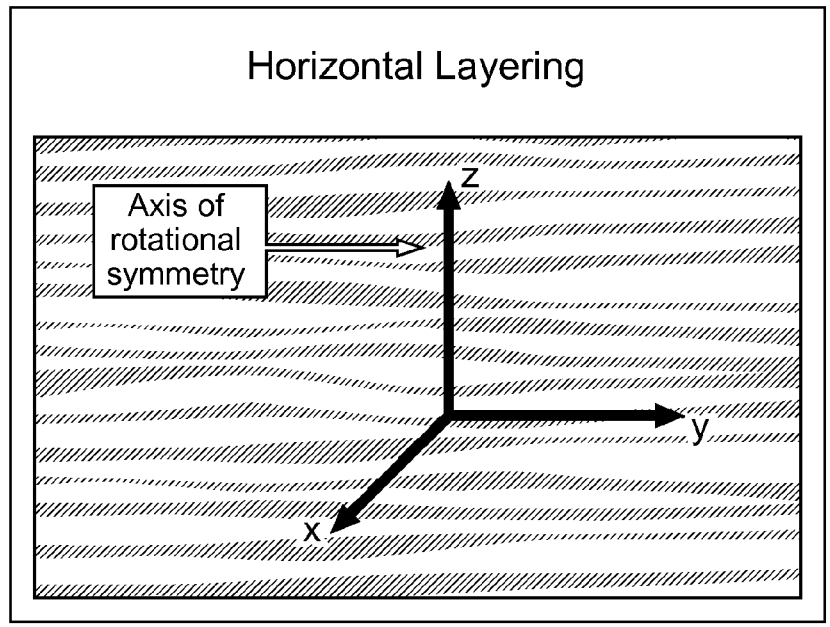
FIG. 12 is a representation of transverse isotropy, with the axis of symmetry being the z-axis according to various embodiments of the invention.

Many rocks in earth formations exhibit anisotropic characteristics. A common form of anisotropy in sedimentary rocks is transverse isotropy (TI). This form of anisotropy has an axis of rotational symmetry. The material properties of the rock are the same for any direction in the plane perpendicular to the symmetry axis, but different from the material properties along the symmetry axis. An example of transverse isotropy in a sedimentary rock is shown in FIG. 12. FIG. 12 is a representation of transverse isotropy, with the axis of symmetry being the z-axis.

Figure 13:
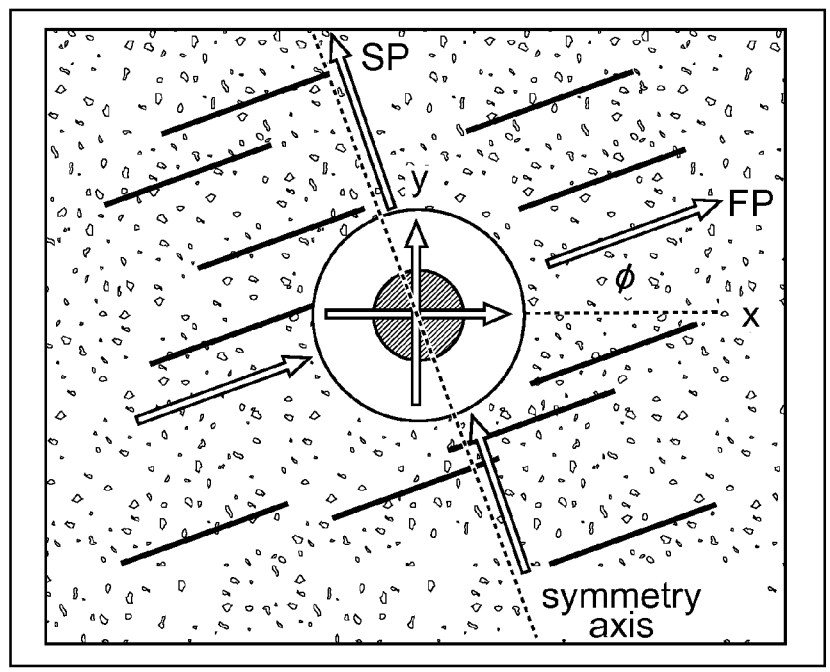
FIG. 13 is a representation of horizontal transverse isotropy anisotropy, where the axis of symmetry is along the slow principal axis and perpendicular to the borehole according to various embodiments of the invention.

When the symmetry axis is orthogonal to the acoustic tool in the borehole, the anisotropy is called horizontal transverse isotropy (HTI). FIG. 13 is a representation of horizontal transverse isotropy anisotropy, where the axis of symmetry is along the slow principal axis (SP) and perpendicular to the borehole. In this example, the anisotropy is due to aligned fractures. The velocity of acoustic shear waves propagating along the z-axis (out of FIG. 13) and polarized in the fracture plane along the fast principal axis (FP) are faster than shear waves propagating along the z-axis and polarized along the SP.

Traditional acoustic tools use cross-dipole technology to detect this type of anisotropy. Cross-dipole acoustic tools have two orthogonal dipole transmitters aligned along the x and y axes in FIGS. 12 and 13. Two orthogonal dipole receivers (also aligned along the x and y axes in the figure) record the waveforms. Thus, four different waveforms are recorded by individually firing each of the transmitters while recording on both receivers. The waveforms are processed in the time, t, or frequency, $\omega$, domain to determine $\phi$, the angle of the fast principal axis relative to the tool axis. The angle $\phi$ and the tool orientation are used to determine the angle of the fast principal axis relative to north. Cross-dipole measurements are routinely made in common well logging practice. One important application for cross-dipole measurements is fracture detection and analysis in open and cased boreholes. The cased-hole application is useful for evaluating hydraulic fracture stimulation. Another important application is identifying stress-induced anisotropy for use in estimating formation stress orientation and magnitude. This information is useful for optimizing the hydraulic fracture process.

As technology advances, more sophisticated acoustic tools are being developed. Electronic and mechanical components are decreasing in size, which can allow many dipole receivers to be disposed azimuthally spaced around the tool instead of having a single pair of orthogonal dipole receivers. Thus, many waveforms at different angles around the tool at the same distance along the length of the tool may be recorded. The following embodiments can provide mechanisms and methods to process the additional information from the increased number of receivers to be disposed azimuthally spaced around the tool to improve angle estimation accuracy and stability.

With the transmitters of FIG. 1 limited to one X-dipole transmitter and one Y-dipole transmitter, FIG. 1 can represent a traditional cross-dipole acoustic tool in a borehole aligned along the z-axis. The tool consists primarily of two azimuthally orthogonal dipole-transmitters and two azimuthally orthogonal dipole-receiver arrays. Each receiver array consists of at least one element aligned along the tool axis. Specified in the traditional way, the recorded acoustic waveforms are denoted by in-line components, (XX, YY), and cross-line components, (XY, YX). The first letter refers to the transmitter, and the second letter to the receiver. Thus, for example, the XY recorded waveform is formed by firing the X-directed dipole transmitter and receiving at the Y-directed dipole receiver. The X and Y receiver arrays are aligned along the z-axis such that the m'th element of receiver array X is at the same z-position as the m'th element of receiver array Y and is denoted as ring m.

Figure 14:
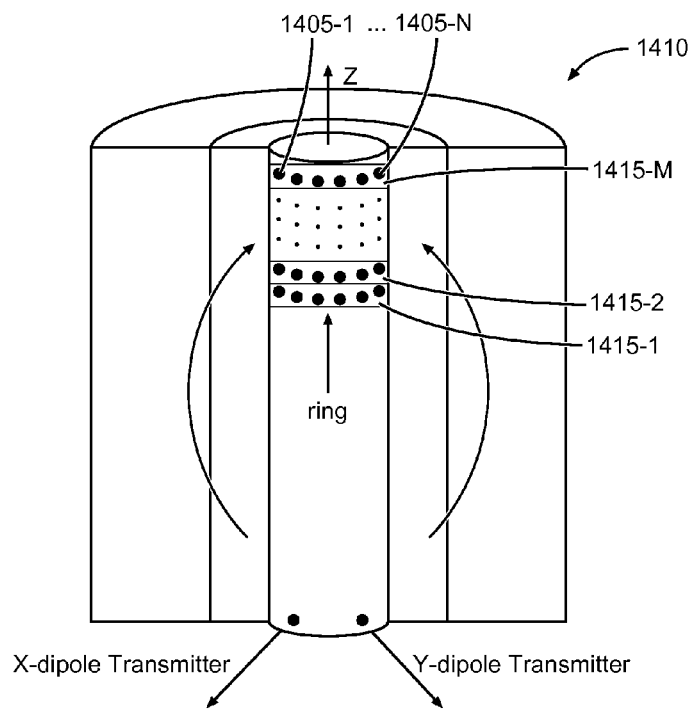
FIG. 14 is a schematic representation of a new generic tool with many dipole receivers spaced in azimuth around the tool according to various embodiments of the invention.

FIG. 14 is a schematic representation of a new generic tool 1410 with many dipole receivers spaced in azimuth around the tool 1410. The tool 1410 can include receiver rings 1415-1, 1415-2, . . . 1415-M. Each of the receiver rings can include acoustic dipole receivers 1405-1 . . . 1405-N azimuthally disposed around the tool 1410. An acoustic dipole receiver is an arrangement of two acoustic receivers on opposite sides of a tool to which it is attached such that a signal received by the acoustic dipole receiver is the difference of signals received at the two acoustic receivers.

Figure 15:
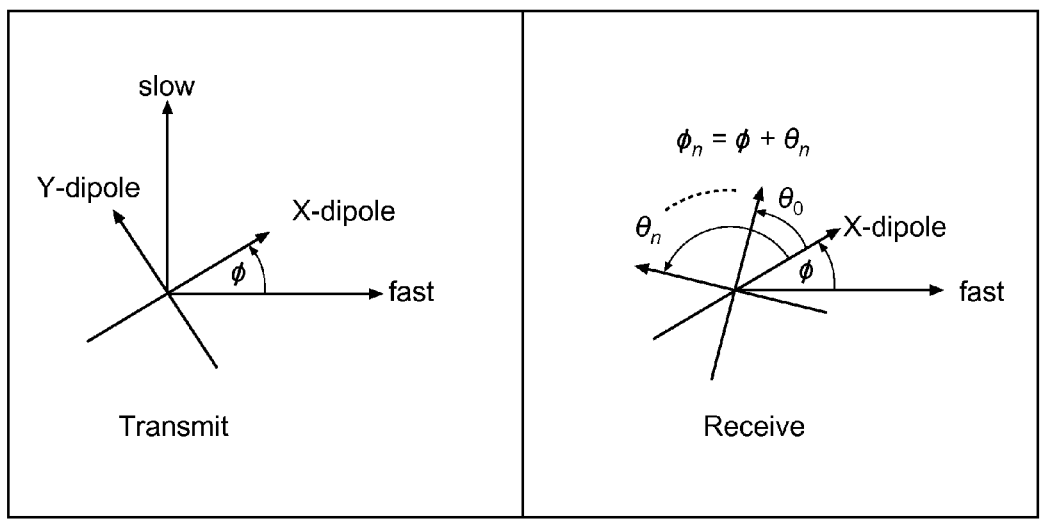
FIG. 15 is a top view of the tool of FIG. 14 according to various embodiments of the invention.

FIG. 15 is a top view of the tool 1410 of FIG. 14. The X-dipole transmitter is directed at angle φ relative to the fast principal wave axis of the formation and the dipole receivers are directed at angles $0 \leq \theta_n < \pi$ relative to the X-dipole. Thus, each dipole receiver is at angle $\phi_n = \phi + \theta_n$ relative to the fast axis. In practice the receivers may be equally spaced but this is not a limitation of the method. The equations described herein are valid for unequally spaced receivers. Note that the orientation of the angle φ in FIG. 15 has changed relative to FIG. 13. The angle from the X-Dipole to the fast axis is $-\phi$. In the classic cross-dipole configuration the X and Y transmitters are aligned with the X and Y receivers and the 2×2 set of waveforms (XX, XY, YX, YY) satisfy the Alford rotation. The Alford rotation equation assumes the waveforms transform as a second order tensor. Thus, $$T^T X^j T = D^j, \quad (16)$$

where $$T = \begin{bmatrix} \cos\phi & \sin\phi \\ -\sin\phi & \cos\phi \end{bmatrix} \equiv \begin{bmatrix} c_\phi & s_\phi \\ -s_\phi & c_\phi \end{bmatrix}, \quad (17)$$

$$X^j = \begin{bmatrix} XX_j & XY_j \\ YX_j & YY_j \end{bmatrix},$$

and $$D^j = \begin{bmatrix} D_{11}^j & 0 \\ 0 & D_{22}^j \end{bmatrix}.$$

$XX_j$, $YY_j$, $XY_j$, and $YX_j$ are the in-line and cross-line waveforms from the transmitter to receiver ring $m_R$. The index j represents a data point $j=\{m_R, t \text{ or } \omega\}$. $D_{11}^j$ and $D_{22}^j$ are the fast and slow principal waves. Matrix variables have reserved superscripts for data point indices and subscripts for the 2×2 matrix element indices.

When dealing with many receivers, the notation changes. Define $X_{n,j}$ as the waveform recorded at the dipole receiver with azimuth index n when firing the X-dipole transmitter, and $Y_{n,j}$ as the waveform recorded at the dipole receiver with azimuth index n when firing the Y-dipole transmitter. Using this notation, a more general 2×2 waveform can be defined as $$X^{nmj} \equiv \begin{bmatrix} X_{11}^{nmj} & X_{12}^{nmj} \\ X_{21}^{nmj} & X_{22}^{nmj} \end{bmatrix} = \begin{bmatrix} X_{n,j} & X_{m,j} \\ Y_{n,j} & Y_{m,j} \end{bmatrix} \{I - c_{(\theta_n - \theta_m)} P\} T^{nm}, \quad (18)$$

where $n \neq m$ are any two azimuth indices, $$T^{nm} = \frac{\begin{bmatrix} c_{\theta_n} & s_{\theta_n} \\ c_{\theta_m} & s_{\theta_m} \end{bmatrix}}{s_{(\theta_n - \theta_m)}^2}, I = \begin{bmatrix} 1 & 0 \\ 0 & 1 \end{bmatrix}, \text{ and } P = \begin{bmatrix} 0 & 1 \\ 1 & 0 \end{bmatrix}. \quad (19)$$

It can be shown that the 2×2 waveform in equation (18) also satisfies the Alford rotation. For any $n \neq m$, the following is obtained $$T^T X^{nmj} T = D^j, \quad (20)$$

where $D^j$ is independent of the azimuth indices. Note that equation (18) is symmetric with respect to permutation of m and n. Thus, for N dipole receivers, there are $N(N-1)/2$ independent 2×2 waveforms. For example, if 8 receivers are distributed uniformly around the tool, taking the difference of opposite receiver waveforms gives 4 dipole receiver waveforms and 6 independent 2×2 waveforms. The notation can be further simplified by defining a single index, $n_A$, into the ordered set of 2×2 waveforms. Explicitly for the example N=4, the following is specified $n_A = 1 \rightarrow (m.n) = (0,1),$ $n_A = 2 \rightarrow (m.n) = (0,2),$ $n_A = 3 \rightarrow (m.n) = (0,3),$ $n_A = 4 \rightarrow (m.n) = (1,2),$ $n_A = 5 \rightarrow (m.n) = (1,3),$ $n_A = 6 \rightarrow (m.n) = (2,3), \quad (21)$ and the generalized Alford rotation is expressed as $$T^T X^{n_A j} T = D^j. \quad (22)$$

Traditional cross-dipole algorithms minimize an objective function dependent upon the Alford rotation of equations (16) and (17) to determine the angle, φ. Since the Alford rotation is preserved for the general 2×2 waveforms, any such objective function may be modified to use all the generalized waveforms. It is clear that increasing the number of waveforms processed may result in improved accuracy and stability of the algorithm.

Processing Methods

This section discusses two embodiments showing the use of the generalized waveforms in different objective functions. The objective functions can be minimized analytically for the angle of anisotropy. See, for example, U.S. Patent Publication 2014/0222346 (A1). A first embodiment uses the following objective function which is applicable in either the time or frequency domain, $$O(\theta, \omega_{ST} \text{ or } t_{ST}) = \sum_{\substack{j_R = \{m_R, t \text{ or } \omega\} \\ m_A \neq n_A}}^{B \text{ or } T} \sum_k |(T_\theta^T (X^{m_A, j_R} - X^{n_A, j_R}) T_\theta)_{kk}|^2 + \quad (23)$$

$$\sum_{k \neq l} \{|(T_\theta^T X^{m_A,j_R} T_\theta)_{kl}|^2 + |(T_\theta^T X^{n_A,j_R} T_\theta)_{kl}|^2\}$$

If the objective function is in the time domain, the summation is over a time window, T, starting at $t_{ST}$. If the objective function is in the frequency domain the summation is over a frequency band, B, starting at $\omega_{ST}$. $\theta$ is the test angle and $$T_\theta = \begin{bmatrix} c_\theta & s_\theta \\ -s_\theta & c_\theta \end{bmatrix}. \quad (24)$$

Each of the moduli in the objective function should vanish and the objective function will be minimized for $\theta = \phi$. The term j can be defined to absorb the azimuth indices such that $j = \{m_A, n_A, m_R, t \text{ or } \omega\} \equiv \{m_A, n_A, j_R\}$ and define the inner product, $$\vec{a} \cdot \vec{b} = \sum_{\substack{j_R \\ m_A \neq n_A}}^{B \text{ or } T} a_j b_j. \quad (25)$$

See, for example, U.S. Patent Publication 2014/0222346 (A1). The solution for the minimizing angle is $$\tan(4\phi) = -\frac{\text{Re}[\vec{a}^* \cdot \vec{d} + \vec{b}^* \cdot \vec{c}]}{\text{Re}[\vec{a}^* \cdot \vec{b} - \vec{c}^* \cdot \vec{d}]}. \quad (26)$$

where $a_j = X_{11}^{m_A j_R} - X_{22}^{m_A j_R}$, $b_j = X_{11}^{n_A j_R} - X_{22}^{n_A j_R}$, $c_j = X_{12}^{m_A j_R} + X_{21}^{m_A j_R}$, $d_j = X_{12}^{n_A j_R} + X_{21}^{n_A j_R}$, (27)

Figure 16:
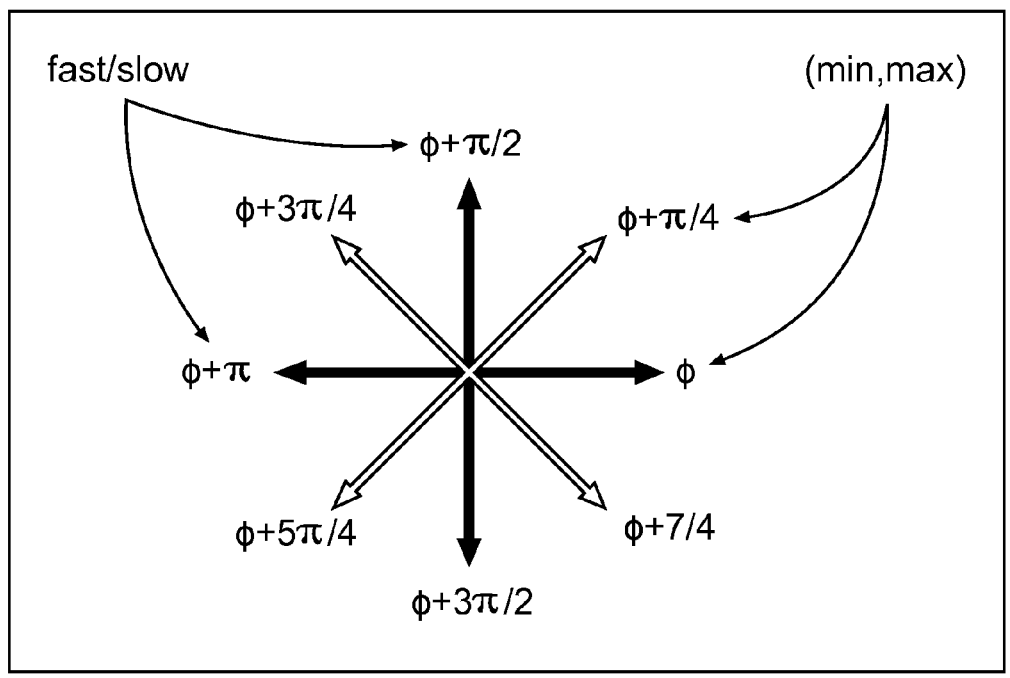
FIG. 16 is a representation of ambiguities with respect to azimuthal angle according to various embodiments of the invention.

The asterisk is complex conjugation, which is only applicable in the frequency domain. If the objective function is defined in the time domain, the vectors are real. If $\phi$ is defined as the angle of the fast axis relative to the X-transmitter then $\phi \rightarrow -\phi$ in equation (10). $\phi$ is ambiguous by a multiple of $\pi/4$, ($\phi \rightarrow \phi + n\pi/4$) as shown below in FIG. 16. FIG. 16 is a representation of ambiguities with respect to azimuthal angle.

There is no concern about the $\pi$ ambiguity, since it has no physical significance. The $\pi/4$ ambiguity corresponds to a minimum and a maximum of the objective function, where the minimum is wanted. This can be determined by substituting $\phi$ and $\phi + \pi/4$ back into the objective function of equation (23) and selecting the angle that minimizes the objective function. This leaves the $\phi$ and $\phi + \pi/2$ ambiguity corresponding to the fast and slow formation axes. This can be resolved by rotating the cross-dipole waveforms by $\phi$ into the fast and slow waveforms using equation (22) and comparing their slowness using either a time semblance algorithm or frequency semblance algorithm as appropriate. Semblance algorithms are known procedures.

A second embodiment is an extension of a cross-dipole algorithm described herein with respect to a single X,Y transmitter and two receiver rings indexed by m and n, where each receiver ring has two orthogonal acoustic receivers. First, a frequency domain objective function is given above as $$O(\theta, \omega_{ST}) = \sum_{\substack{j_n, j_m \\ k,l}}^{B(\omega_{ST}, W)} |(T_\theta^T X^{j_n} T_\theta - D^{jm} Z_{est}^{m-n})_{kl}|^2. \quad (28)$$

In equation (28), $j_n = (n, \omega)$ and $j_m = (m, \omega)$ where m and n are receiver indices, and the frequency summation is over a frequency band starting at $\omega_{ST}$ with width W. The Fourier transformed cross-dipole waveform is $$X^{j_n} = \begin{bmatrix} XX_n(\omega) & XY_n(\omega) \\ YX_n(\omega) & YY_n(\omega) \end{bmatrix}, \quad (29)$$

where n is receiver index. The diagonal matrix $D^{j_n}$ can be computed by diagonalizing the cross-dipole waveform of equation (29) with a unitary transformation. It is an estimate of the fast and slow waveforms in the frequency domain at receiver n, $$U' X^{j_n} U = \begin{bmatrix} D_{11}^{j_n} & 0 \\ 0 & D_{22}^{j_n} \end{bmatrix}. \quad (30)$$

In equation (30), U' is the complex conjugate transpose of U. Using methods described herein it can ensured that the $D_{11}$ element is the fast wave and the $D_{22}$ element is the slow wave. The diagonal matrix $Z_{est}$ is given by $$Z_{est} = \begin{bmatrix} z_1 & 0 \\ 0 & z_2 \end{bmatrix}. \quad (31)$$

A method for calculating $Z_{est}$ has been described earlier herein. The diagonal matrix $Z_{est}^{m-n}$ ($Z_{est}$ raised to the m−n power) propagates the matrix $D^{jm}$ at receiver m to the matrix $D^{jn}$ at receiver n. The notation can be simplified by defining $j = (j_m, j_n)$, then $$O(\theta, \omega_{ST}) = \sum_{j,k,l} |(T_\theta^T X^j T_\theta - \Delta^j)_{kl}|^2, \quad (32)$$

where $X^j = X^{j_n}$, $\Delta^j = D^{jm} Z_{est}^{m-n}$. (33)

The solution for the angle of anisotropy may be found as $$\tan(2\phi) = \frac{\text{Re}[\vec{a}^* \cdot \vec{d}]}{\text{Re}[\vec{b}^* \cdot \vec{d}]}. \quad (34)$$

where vectors have been defined by $d_j = \Delta_{22}^j - \Delta_{11}^j$, $a_j = XY^j + YX^j$, $b_j = YY^j - XX^j$. (35)

See, for example, U.S. Patent Publication 2014/0222346 (A1).

If φ is defined as the angle of the fast axis relative to the X-transmitter then φ→−φ in equation (34). φ is ambiguous by a multiple of π/2. The π/2 ambiguity corresponds to a minimum and a maximum of the objective function, where the minimum is wanted. This can be determined by substituting φ and φ+π/2 back into the objective function equation (32) and selecting the angle that minimizes the objective function. There is no fast-slow ambiguity in this example. The extension of the objective function to generalized waveforms is $$O(\theta, \omega_{ST}) = \sum_{\substack{j_n, j_m \\ m_A, n_A \\ k, l}}^{B(\omega_{ST}, W)} |(T_\theta^T X^{m_A, j_n} T_\theta - D^{n_A, j_m} Z_{est, n_A}^{m-n})_{kl}|^2 \qquad (36)$$

$$= \sum_{j, k, l} |(T_\theta^T X^j T_\theta - \Delta^j)_{kl}|^2,$$

where $$X^j = X^{m_A, j_n}, \qquad (37)$$

$$\Delta^j = D^{n_A, j_m} Z_{est, n_A}^{m-n}.$$

The solution for the angle of anisotropy can be determined as $$\tan(2\phi) = \frac{\mathrm{Re}[\vec{a}^* \cdot \vec{d}]}{\mathrm{Re}[\vec{b}^* \cdot \vec{d}]}, \qquad (23)$$

where $$d_j = \Delta_{22}^{n_A, jm} - \Delta_{11}^{n_A, jm}, \quad a_j = X_{12}^{m_A, jn} + X_{21}^{m_A, jn}, \qquad (24)$$

$$b_j = X_{22}^{m_A, jn} - X_{11}^{m_A, jn}.$$

Again, φ is ambiguous by a multiple of π/2, which can be handled in the same way as noted previously.

Embodiments of algorithmic approaches can be designed to take advantage of additional azimuthal receivers available in more advanced acoustic tools. The algorithm forms a complete set of 2×2 waveforms from the receiver data that all satisfy the Alford rotation. Using the complete set of waveforms improves the accuracy and stability of the algorithm. The new algorithm also can solve for the angle of anisotropy analytically.

Cross-dipole measurements are routinely made in common well logging practice. One important application for cross-dipole measurements is fracture detection and analysis in open and cased boreholes. The cased-hole application is useful for evaluating hydraulic fracture stimulation. Another important application is identifying stress-induced anisotropy for use in estimating formation stress orientation and magnitude. This information is useful for optimizing the hydraulic fracture process. Better accuracy and stability in detecting anisotropy as taught herein may provide operational advantages.

Current HTI anisotropy detection algorithms based on the traditional crossed-dipole acoustic tool use a single crossed-dipole waveform to determine the angle of anisotropy. Earlier attempts to solve the problem suggest using numerical search methods such as very fast simulated annealing, gradient search, or brute force to minimize the objective function. Embodiments as taught herein may use a complete set of waveforms recorded at multiple azimuth positions and may solve for the angle of anisotropy analytically.

Figure 17:
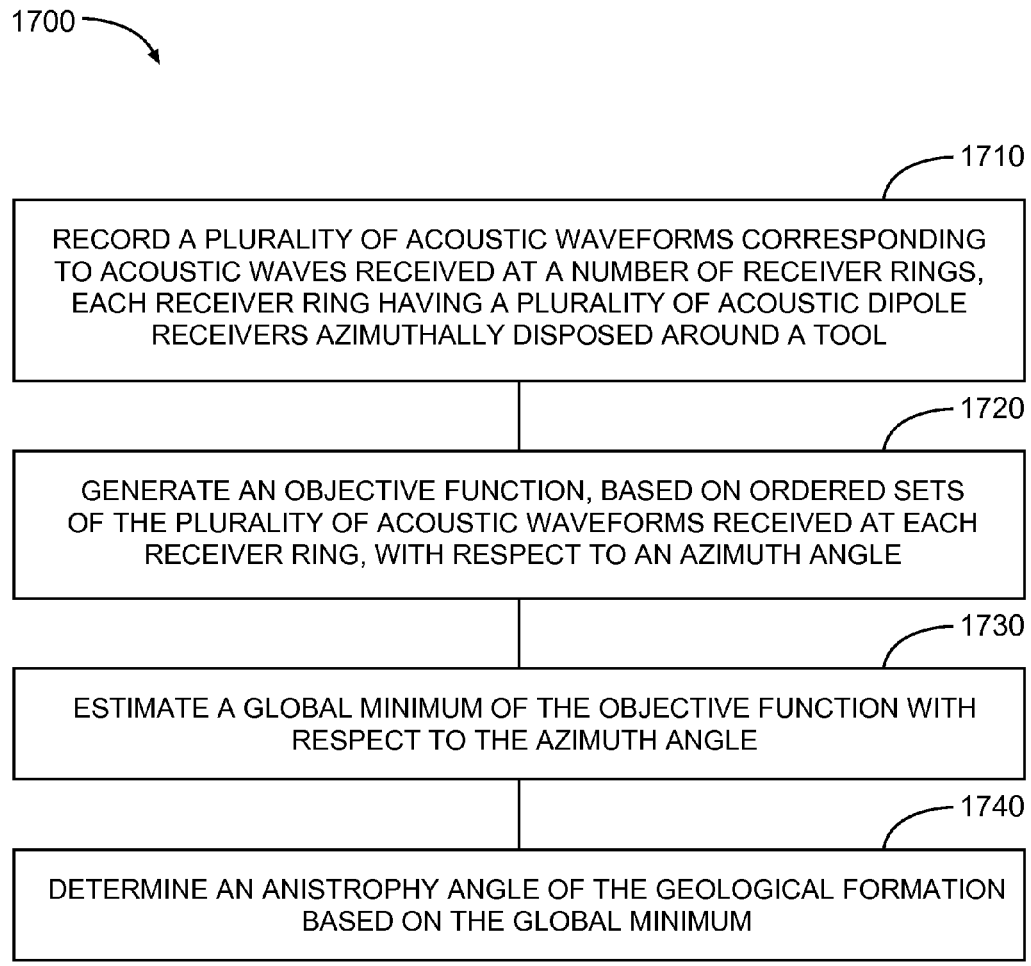
FIG. 17 is a flow diagram of a processor-implemented method of estimating an azimuth angle according to various embodiments of the invention.

FIG. 17 is a flow diagram of a processor-implemented method 1700 of estimating an azimuth angle. The processor-implemented method can be executed by one or more processors. At 1710, a plurality of acoustic waveforms corresponding to acoustic waves that are received at a number of receiver rings are recorded. Each receiver ring can be disposed along a length of a longitudinal axis of a tool at a different distance from the other receiver rings along the length of the longitudinal axis, where the tool can be operatively surrounded by a geological formation. Each receiver ring can have a plurality of acoustic dipole receivers azimuthally disposed around the tool and can operatively receive acoustic waves, the acoustic waves being generated by orthogonal dipole transmitters in a transmitter ring attached to the tool.

At 1720, an objective function is generated with respect to an azimuth angle based on ordered sets of the plurality of acoustic waveforms received at each receiver ring. The azimuth angle may correspond to an orientation of the orthogonal dipole transmitters and the acoustic dipole receivers relative to fast and slow principal flexural wave axes. The processor-implemented method 1700 or a similar method can include forming the ordered sets of the plurality of acoustic waveforms from a receiver ring of the number of receiver rings having N dipole receivers providing N(N−1)/2 independent 2×2 waveforms, N being an integer greater than two.

The processor-implemented method 1700 or a similar method can include generating the objective function to include extending a first objective function to include generalized waveforms correlated to the plurality of acoustic dipole receivers azimuthally disposed around the tool in each ring, the first objective function generated with respect to in-line and cross-line waveforms from transmitter rings to receiver rings, each transmitter ring having only two dipole transmitters orthogonal to each other and each receiver ring having only two dipole receivers orthogonal to each other. The processor-implemented method 1700 or a similar method can include diagonalizing independent 2×2 waveforms, each independent 2×2 waveform being in-line and cross-line components according to two azimuth indices, the two azimuth indices not equal to each other, each azimuth index correlated to a different one of the acoustic dipole receivers of one of the receiver rings.

At 1730, a global minimum of the objective function with respect to the azimuth angle is estimated. The processor-implemented method 1700 or a similar method can include estimating the global minimum of the objective function to be accomplished analytically or by using a numerical search algorithm.

At 1740, an anisotropy angle of the geological formation is determined based on the global minimum. The processor-implemented method 1700 or a similar method can include determining the anisotropy angle of the geological formation to include implementing the generating, the estimating, and the determining for a data point space defined over multiple frequency bands having different starting frequencies or by multiple different time periods having different starting times.

The processor-implemented method 1700 or a similar method can include removing existing ambiguities associated with the fast and slow principal flexural wave axes or ambiguities associated with minima and maxima of the objective function. Removing existing objective function minimum/maximum ambiguity includes substituting the azimuth angle into the objective function and substituting an ambiguous angle (typically azimuth angle+$\pi$/2 or azimuth angle+$\pi$/4) into the objective function, and selecting the angle that minimizes the objective function. Removing existing fast slow principal axis ambiguity can include either constraining auxiliary parameters a priori to eliminate the ambiguity before minimizing the objective function; or eigenvalue alignment a priori to eliminate the ambiguity before minimizing the objective function; or rotating cross-dipole waveforms of the ordered sets of the plurality of acoustic waveforms by min/max ambiguity resolved azimuth angle into the fast and slow waveforms and comparing slowness of the cross-dipole waveforms using either a time semblance algorithm or frequency semblance algorithm.

In various embodiments, a non-transitory machine-readable storage device can comprise instructions stored thereon, which, when performed by a machine, cause the machine to perform operations, the operations comprising one or more features similar to or identical to features of methods and techniques described herein. The physical structures of such instructions may be operated on by one or more processors. Executing these physical structures can cause the machine to perform operations comprising recording a plurality of acoustic waveforms corresponding to acoustic waves received at a number of receiver rings, each receiver ring disposed along a length of a longitudinal axis of a tool at a different distance from the other receiver rings along the length of the longitudinal axis, the tool surrounded by a geological formation, each receiver ring having a plurality of acoustic dipole receivers azimuthally disposed around the tool and receiving acoustic waves, the acoustic waves being generated by orthogonal dipole transmitters in a transmitter ring attached to the tool; generating an objective function, based on ordered sets of the plurality of acoustic waveforms received at each receiver ring, with respect to an azimuth angle, wherein the azimuth angle corresponds to an orientation of the orthogonal dipole transmitters and the acoustic dipole receivers relative to fast and slow principal flexural wave axes; estimating a global minimum of the objective function with respect to the azimuth angle; and determining an anisotropy angle of the geological formation based on the global minimum. The instructions can include instructions to operate a tool or tools having sensors disposed downhole in a borehole to provide data to a processing unit in accordance with the teachings herein.

Instructions generating the objective function can include generating the objective function with respect to the azimuth angle and a set of auxiliary parameters. The auxiliary parameters may include fast and slow slowness values. Including fast and slow slowness values as auxiliary parameters may depend on the form of the objective function. Instructions to generate the objective function can include extending a first objective function to include generalized waveforms correlated to the plurality of acoustic dipole receivers azimuthally disposed around the tool in each ring, the first objective function generated with respect to in-line and cross-line waveforms from transmitter rings to receiver rings, each transmitter ring having only two dipole transmitters orthogonal to each other and each receiver ring having only two dipole receivers orthogonal to each other.

The instructions can include instructions to form the ordered sets of the plurality of acoustic waveforms from a receiver ring of the number of receiver rings having N dipole receivers providing N(N−1)/2 independent 2×2 waveforms, N being an integer greater than two. The instructions can include instructions to diagonalize independent 2×2 waveforms, each independent 2×2 waveform being in-line and cross-line components according to two azimuth indices, the two azimuth indices not equal to each other, each azimuth index correlated to a different one of the acoustic dipole receivers of one of the receiver rings.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

In various embodiments, an apparatus can comprise: a tool having a longitudinal axis; a transmitter ring attached to the tool, the transmitter ring having orthogonal dipole transmitters; a number of receiver rings, each receiver ring disposed along a length of the longitudinal axis at a different distance from the other receiver rings along the length, each receiver ring having a plurality of acoustic dipole receivers azimuthally disposed around the tool; recording logic to record a plurality of acoustic waveforms corresponding to acoustic waves received at the acoustic dipole receivers when the tool is operated in a geological formation, the acoustic waves being generated by the orthogonal dipole transmitters; and a signal processor to generate an objective function, based on ordered sets of the plurality of acoustic waveforms received at each receiver ring, with respect to an azimuth angle, wherein the azimuth angle corresponds to an orientation of the orthogonal dipole transmitters and the acoustic dipole receivers relative to fast and slow principal flexural wave axes, with the signal processor structured to estimate a global minimum of the objective function with respect to the azimuth angle and to determine an anisotropy angle of the geological formation based on the global minimum. The tool, transmitter ring, orthogonal dipole transmitters, receiver rings, and plurality of acoustic dipole receivers may be realized by a structure similar to or identical to tool 1410 and its attached components as shown in FIG. 14. Such a tool can be used in a system architecture such as represented in FIG. 11 replacing tool 100 with corresponding changes in the other components such as the recording logic and signal processor to operate with a structure similar to or identical to tool 1410 as taught herein. The tool can comprise one of a wireline tool or a measurement while drilling tool. The tool may be realized as a wireline tool operable in a wireline system similar to or identical to the wireline system of FIG. 6. The tool may be realized as a measurement while drilling tool operable in a measurement while drilling system similar to or identical to the measurement while drilling system of FIG. 5.

The signal processor to generate an objective function, based on ordered sets of the plurality of acoustic waveforms received at the plurality of acoustic dipole receivers of each receiver ring, can be structured to generate the objective function with respect to the azimuth angle and a set of auxiliary parameters. The auxiliary parameters can include fast and slow slowness values. Including fast and slow slowness values as auxiliary parameters may depend on the form of the objective function.

In various embodiments, a receiver ring of the number of receiver rings can have N dipole receivers and can be operable to provide N(N−1)/2 independent 2×2 waveforms, N being an integer greater than two. The signal processor can be structured to diagonalize independent 2×2 waveforms, each independent 2×2 waveform being in-line and cross-line components according to two azimuth indices, the two azimuth indices not equal to each other, each azimuth index correlated to a different one of the acoustic dipole receivers of one of the receiver rings. The signal processor can be structured to remove existing ambiguities associated with the fast and slow principal flexural wave axes and/or objective function minima and maxima. The signal processor and other components may be structured to execute various functions as taught herein. Features of any appropriate permutations of apparatus/systems, processes, or other combinations of features, as taught herein, may be combined into a apparatus/system or process according to the teachings herein.

HTI Derivations

The following is a description of HTI derivations. The description is presented in a lecture format. FIG. 15 is a schematic representation of crossed dipole transmitters oriented at angle $\phi$ relative to the fast axis of an anisotropic formation with arbitrarily oriented dipole receivers. If we fire the X-dipole the waveform S can be decomposed into two components directed along the formation axes.

$$X_f = ST_f c_\phi \equiv S_f c_\phi$$

$$X_s = ST_s s_\phi \equiv S_s s_\phi, \tag{H1}$$

where $T_f$ and $T_s$ are the fast and slow formation transfer functions. Similarly firing the Y-dipole gives $$Y_f = -ST_f s_\phi \equiv -S_f s_\phi$$

$$Y_s = ST_s c_\phi \equiv S_s c_\phi. \tag{H2}$$

When the transmitted pulse is received in dipole receiver n the fast and slow waveforms are combined as $$X_n = X_f c_{\phi n} + X_s s_{\phi n} = S_f c_\phi c_{\phi n} + S_s s_\phi s_{\phi n}$$

$$Y_n = Y_f c_{\phi n} + Y_s s_{\phi n} = -S_f s_\phi c_{\phi n} + S_s c_\phi s_{\phi n}. \tag{H3}$$

where $\phi_n = \phi + \theta_n$, and $\theta_n$ is the angle of the receiver relative to the X transmitter. We defined $\phi$ as the angle of the X transmitter relative to the fast axis. If we define $\phi$ as the angle of the fast axis relative to the X transmitter then $\phi \to -\phi$ in equations H1-H3. We wish to derive convenient Alford rotation equations for arbitrary receiver pairs ($n_1$, $n_2 \neq n_1$). Rewrite equation (H3) as $$X_{n1} = S_f c_\phi c_{\phi n2 + (\theta n1 - \theta n2)} + S_s s_\phi s_{\phi n2 + (\theta n1 - \theta n2)} \tag{H4}$$

$$= S_f c_\phi c_{\phi n2} c_{(\theta n1 - \theta n2)} - S_f c_\phi s_{\phi n2} s_{(\theta n1 - \theta n2)} +$$

$$S_s s_\phi s_{\phi n2} c_{(\theta n1 - \theta n2)} + S_s s_\phi c_{\phi n2} s_{(\theta n1 - \theta n2)}$$

$$= X_{n2} c_{(\theta n1 - \theta n2)} + (S_s s_\phi c_{\phi n2} - S_f c_\phi s_{\phi n2}) s_{(\theta n1 - \theta n2)}, \text{ and}$$

$$Y_{n1} = -S_f s_\phi c_{\phi n2 + (\theta n1 - \theta n2)} + S_s c_\phi s_{\phi n2 + (\theta n1 - \theta n2)} \tag{H5}$$

$$= -S_f s_\phi c_{\phi n2} c_{(\theta n1 - \theta n2)} + S_f s_\phi s_{\phi n2} s_{(\theta n1 - \theta n2)} +$$

$$S_s c_\phi s_{\phi n2} c_{(\theta n1 - \theta n2)} + S_s c_\phi c_{\phi n2} s_{(\theta n1 - \theta n2)}$$

$$= Y_{n2} c_{(\theta n1 - \theta n2)} + (S_s c_\phi c_{\phi n2} + S_f s_\phi s_{\phi n2}) s_{(\theta n1 - \theta n2)}.$$

Combine equations (H4) and (H5) to get $$s_\phi X_{n1} + c_\phi Y_{n1} = (s_\phi X_{n2} + c_\phi Y_{n2}) c_{(\theta n1 - \theta n2)} + S_s c_{\phi n2} s_{(\theta n1 - \theta n2)}, \tag{H6}$$

and $$c_\phi X_{n1} - s_\phi Y_{n1} = (c_\phi X_{n2} - s_\phi Y_{n2}) c_{(\theta n1 - \theta n2)} - S_f s_{\phi n2} s_{(\theta n1 - \theta n2)}. \tag{H7}$$

Equations (H6) and (H7) can be combined into a matrix equation, $$\begin{bmatrix} c_\phi & -s_\phi \\ s_\phi & c_\phi \end{bmatrix} \begin{bmatrix} X_{n1} \\ Y_{n1} \end{bmatrix} = \tag{H8}$$

$$c_{(\theta n1 - \theta n2)} \begin{bmatrix} c_\phi & -s_\phi \\ s_\phi & c_\phi \end{bmatrix} \begin{bmatrix} X_{n2} \\ Y_{n2} \end{bmatrix} + s_{(\theta n1 - \theta n2)} \begin{bmatrix} -s_{\phi n2} & 0 \\ 0 & c_{\phi n2} \end{bmatrix} \begin{bmatrix} S_f \\ S_s \end{bmatrix}.$$

Permute the indices ($n_1$, $n_2$) in equation (H8) to get a second matrix equation, $$\begin{bmatrix} c_\phi & -s_\phi \\ s_\phi & c_\phi \end{bmatrix} \begin{bmatrix} X_{n2} \\ Y_{n2} \end{bmatrix} = \tag{H9}$$

$$c_{(\theta n1 - \theta n2)} \begin{bmatrix} c_\phi & -s_\phi \\ s_\phi & c_\phi \end{bmatrix} \begin{bmatrix} X_{n1} \\ Y_{n1} \end{bmatrix} - s_{(\theta n1 - \theta n2)} \begin{bmatrix} -s_{\phi n1} & 0 \\ 0 & c_{\phi n1} \end{bmatrix} \begin{bmatrix} S_f \\ S_s \end{bmatrix}.$$

Combine equations (H8) and (H9) to get $$\begin{bmatrix} c_\phi & -s_\phi \\ s_\phi & c_\phi \end{bmatrix} \begin{bmatrix} X_{n1} & X_{n2} \\ Y_{n1} & Y_{n2} \end{bmatrix} = \tag{H10}$$

$$c_{(\theta n1 - \theta n2)} \begin{bmatrix} c_\phi & -s_\phi \\ s_\phi & c_\phi \end{bmatrix} \begin{bmatrix} X_{n2} & X_{n1} \\ Y_{n2} & Y_{n1} \end{bmatrix} + s_{(\theta n1 - \theta n2)} \begin{bmatrix} -s_{\phi n2} S_f & s_{\phi n1} S_f \\ c_{\phi n2} S_s & -c_{\phi n1} S_s \end{bmatrix}$$

Substitute the identity $$\begin{bmatrix} S_f & 0 \\ 0 & S_s \end{bmatrix} \begin{bmatrix} -s_{\phi n2} & s_{\phi n1} \\ c_{\phi n2} & -c_{\phi n1} \end{bmatrix} = \begin{bmatrix} -s_{\phi n2} S_f & s_{\phi n1} S_f \\ c_{\phi n2} S_s & -c_{\phi n1} S_s \end{bmatrix} \tag{H11}$$

into equation (H10), $$\begin{bmatrix} c_\phi & -s_\phi \\ s_\phi & c_\phi \end{bmatrix} \begin{bmatrix} X_{n1} & X_{n2} \\ Y_{n1} & Y_{n2} \end{bmatrix} = c_{(\theta n1 - \theta n2)} \begin{bmatrix} c_\phi & -s_\phi \\ s_\phi & c_\phi \end{bmatrix} \begin{bmatrix} X_{n2} & X_{n1} \\ Y_{n2} & Y_{n1} \end{bmatrix} + \tag{H12}$$

$$s_{(\theta n1 - \theta n2)} \begin{bmatrix} S_f & 0 \\ 0 & S_s \end{bmatrix} \begin{bmatrix} -s_{\phi n2} & s_{\phi n1} \\ c_{\phi n2} & -c_{\phi n1} \end{bmatrix}.$$

Define the orthonormal transformation $$T_\phi = \begin{bmatrix} c_\phi & s_\phi \\ -s_\phi & c_\phi \end{bmatrix}, \tag{H13}$$

where $T_\phi^T = T_\phi^{-1}$ and solve for the fast and slow waves, $$T_\phi^T \left\{ \begin{bmatrix} X_{n1} & X_{n2} \\ Y_{n1} & Y_{n2} \end{bmatrix} - c_{(\theta n1 - \theta n2)} \begin{bmatrix} X_{n2} & X_{n1} \\ Y_{n2} & Y_{n1} \end{bmatrix} \right\} \frac{R^{-1}}{s_{(\theta n1 - \theta n2)}} = \begin{bmatrix} S_f & 0 \\ 0 & S_s \end{bmatrix}, \tag{H14}$$

where $$R \equiv \begin{bmatrix} -s_{\phi n2} & s_{\phi n1} \\ c_{\phi n2} & -c_{\phi n1} \end{bmatrix}. \tag{H15}$$

Equation (H14) can be further manipulated to look like an Alford rotation. The inverse of R is $$R^{-1} \equiv \frac{\begin{bmatrix} -c_{\phi n1} & -s_{\phi n1} \\ -c_{\phi n2} & -s_{\phi n2} \end{bmatrix}}{(s_{\phi n2} c_{\phi n1} - s_{\phi n1} c_{\phi n2})} \quad \text{(H16)}$$

$$= -\frac{\begin{bmatrix} c_{\phi n1} & s_{\phi n1} \\ c_{\phi n2} & s_{\phi n2} \end{bmatrix}}{s_{(\phi n2 - \phi n1)}}$$

$$= \frac{\begin{bmatrix} c_{\phi n1} & s_{\phi n1} \\ c_{\phi n2} & s_{\phi n2} \end{bmatrix}}{s_{(\phi n1 - \phi n2)}}.$$

The matrix in the numerator on the right hand side of equation (H16) can be factored as $$\begin{bmatrix} c_{\phi n1} & s_{\phi n1} \\ c_{\phi n2} & s_{\phi n2} \end{bmatrix} = \begin{bmatrix} (c_\phi c_{\theta n1} - s_\phi s_{\theta n1}) & (s_\phi c_{\theta n1} + c_\phi s_{\theta n1}) \\ (c_\phi c_{\theta n2} - s_\phi s_{\theta n2}) & (s_\phi c_{\theta n2} + c_\phi s_{\theta n2}) \end{bmatrix} \quad \text{(H17)}$$

$$= \begin{bmatrix} c_{\theta n1} & s_{\theta n1} \\ c_{\theta n2} & s_{\theta n2} \end{bmatrix} \begin{bmatrix} c_\phi & s_\phi \\ -s_\phi & c_\phi \end{bmatrix}.$$

Substituting equation (H16) and (H17) into (H14) gives $$T_\phi^T \left\{ \begin{bmatrix} X_{n1} & X_{n2} \\ Y_{n1} & Y_{n2} \end{bmatrix} - c_{(\theta n1 - \theta n2)} \begin{bmatrix} X_{n2} & X_{n1} \\ Y_{n2} & Y_{n1} \end{bmatrix} \right\} T_{12} T_\phi = \begin{bmatrix} S_f & 0 \\ 0 & S_s \end{bmatrix}, \quad \text{(H18)}$$

$$\text{where } T_{12} = \frac{\begin{bmatrix} c_{\theta n1} & s_{\theta n1} \\ c_{\theta n2} & s_{\theta n2} \end{bmatrix}}{s_{(\theta n1 - \theta n2)}^2}. \quad \text{(H19)}$$

Finally substitute $$\begin{bmatrix} X_{n2} & X_{n1} \\ Y_{n2} & Y_{n1} \end{bmatrix} = \begin{bmatrix} X_{n1} & X_{n2} \\ Y_{n1} & Y_{n2} \end{bmatrix} \begin{bmatrix} 0 & 1 \\ 1 & 0 \end{bmatrix} \equiv \begin{bmatrix} X_{n1} & X_{n2} \\ Y_{n1} & Y_{n2} \end{bmatrix} P, \quad \text{(H20)}$$

into equation (H18) to get the final form for the Alford rotation for any pair of receivers (n, m≠n), $$T_\phi^T X^{nm} T_\phi = \begin{bmatrix} S_f & 0 \\ 0 & S_s \end{bmatrix}, \text{ where} \quad \text{(H21)}$$

$$X^{nm} \equiv \begin{bmatrix} X_n & X_m \\ Y_n & Y_m \end{bmatrix} \{I - c_{(\theta n - \theta m)} P\} T^{nm}, \quad \text{(H22)}$$

$$T^{nm} = \frac{\begin{bmatrix} c_{\theta n} & s_{\theta n} \\ c_{\theta n} & s_{\theta n} \end{bmatrix}}{s_{(\theta n - \theta n)}^2}.$$

We have changed the notation to superscripts for the matrix variables to avoid confusion with the matrix element indices. Note that equation (H22) is symmetric with respect to permutation of m and n. This is easily shown using the identity $P^2 = I$ and the fact that multiplying by P on the left switches rows instead of columns, $$X^{mn} \equiv \begin{bmatrix} X_m & X_n \\ Y_m & Y_n \end{bmatrix} \{I - c_{(\theta m - \theta n)} P\} T^{mn} \quad \text{(H23)}$$

$$= \begin{bmatrix} X_n & X_m \\ Y_n & Y_m \end{bmatrix} P \{I - c_{(\theta n - \theta m)} P\} P T^{nm}$$

$$= \begin{bmatrix} X_n & X_m \\ Y_n & Y_m \end{bmatrix} \{I - c_{(\theta n - \theta m)} P\} P^2 T^{nm}$$

$$= X^{nm}$$

Therefore the number of independent 2×2 waveforms satisfying the Alford rotation is N(N−1)/2 where N is the number of dipole receivers. As an example if we have 8 azimuthal receivers, we can form four dipole receivers and 6 independent 2×2 waveforms indexed by {(0,1),(0,2),(0,3), (1,2),(1,3),(2,3)}. As another example consider the classic cross dipole receiver configuration. Then we have a single cross-dipole waveform, $X^{01}$, with $\theta_0 = 0$ and $\theta_1 = \pi/2$. In this case equation (H22) reduces to $$X^{01} = \begin{bmatrix} X_0 & X_1 \\ Y_0 & Y_1 \end{bmatrix} \equiv \begin{bmatrix} XX & XY \\ YX & YY \end{bmatrix}, \quad \text{(H24)}$$

and equation (H21) becomes $$\begin{bmatrix} S_f & 0 \\ 0 & S_s \end{bmatrix} = \begin{bmatrix} c_\phi & -s_\phi \\ s_\phi & c_\phi \end{bmatrix} \begin{bmatrix} XX & XY \\ YX & YY \end{bmatrix} \begin{bmatrix} c_\phi & s_\phi \\ -s_\phi & c_\phi \end{bmatrix} \quad \text{(H25)}$$

$$= \begin{bmatrix} c_\phi & -s_\phi \\ s_\phi & c_\phi \end{bmatrix} \begin{bmatrix} (XX c_\phi - XY s_\phi) & (XX s_\phi + XY c_\phi) \\ (YX c_\phi - YY s_\phi) & (YX s_\phi - YY c_\phi) \end{bmatrix}$$

$$= \begin{bmatrix} c_\phi(XX c_\phi - XY s_\phi) - s_\phi(YX c_\phi - YY s_\phi) & c_\phi(XX s_\phi + XY c_\phi) - s_\phi(YX s_\phi + YY c_\phi) \\ s_\phi(XX c_\phi - XY s_\phi) + c_\phi(XY c_\phi - YY s_\phi) & s_\phi(XX s_\phi + XY c_\phi) + c_\phi(YX s_\phi + YY c_\phi) \end{bmatrix}$$

$$= \begin{bmatrix} c_\phi^2 XX + s_\phi^2 YY - s_\phi c_\phi(XY + YX) & c_\phi^2 XY + s_\phi^2 YX - s_\phi c_\phi(XX - YY) \\ c_\phi^2 YX + s_\phi^2 XY + s_\phi c_\phi(XX + YY) & s_\phi^2 XX + c_\phi^2 YY + s_\phi c_\phi(XY + YX) \end{bmatrix}.$$

The classic cross-dipole waveform can also be expressed in terms of the fast and slow waves as $$\begin{bmatrix} XX & XY \\ YX & YY \end{bmatrix} = \begin{bmatrix} c_\phi & s_\phi \\ -s_\phi & c_\phi \end{bmatrix} \begin{bmatrix} S_f & 0 \\ 0 & S_s \end{bmatrix} \begin{bmatrix} c_\phi & -s_\phi \\ s_\phi & c_\phi \end{bmatrix} \quad \text{(H26)}$$

$$= \begin{bmatrix} c_\phi & s_\phi \\ -s_\phi & c_\phi \end{bmatrix} \begin{bmatrix} S_f c_\phi & -S_f s_\phi \\ S_s s_\phi & S_s c_\phi \end{bmatrix}$$

$$= \begin{bmatrix} S_f c_\phi^2 + S_s s_\phi^2 & (S_s - S_f) s_\phi c_\phi \\ (S_s - S_f) s_\phi c_\phi & S_f s_\phi^2 + S_s c_\phi^2 \end{bmatrix}.$$

Next we will derive the equations for analytically computing the angle for the time and frequency domain algorithms. These algorithms use the classic cross-dipole receiver configuration. Then we will derive the corresponding equations for the general Alford rotation. First notice that equation (H26) says XY=YX if the data satisfies the Alford rotation. Then we should use the sum of XY and YX in equation (H25) to cancel noise, $$\begin{bmatrix} S_f & 0 \\ 0 & S_s \end{bmatrix} = \begin{bmatrix} (c_\phi^2 XX + s_\phi^2 YY - s_\phi c_\phi (XY+YX)) & 0.5(c_{2\phi}(XY+YX) + s_{2\phi}(XX-YY)) \\ 0.5(c_{2\phi}(XY+YX) + s_{2\phi}(XX-YY)) & (s_\phi^2 XX + c_\phi^2 YY + s_\phi c_\phi (XY+YX)) \end{bmatrix}. \quad (H27)$$

The time domain algorithm assumes the fast and slow principal waves ($S_f$, $S_s$) are essentially the same except for a time shift. Thus a fast wave at receiver m can be converted into a slow wave at receiver n by the following time shift, $$S_{s,n}(t+T_1+T_{sh}) = S_{f,m}(t+T_1), \quad (H28)$$

where $$T_1 = T_s + s_f(z_m - z_{mid}), \text{ and } T_{sh} = \delta s \cdot z_m + s_s(z_n - z_m). \quad (H29)$$

In equation (H29), the slowness of the fast principal wave is denoted by $s_f$ and the slowness of the slow principal wave is denoted by $s_s$ and $\delta s = s_s - s_f$. $T_s$ is a start time that positions the start of the processing window at the beginning of the fast flexural wave at mid-array. In practice we don't know this start time a priori, so the XX flexural wave is used to estimate $T_s$. $z_m$ is the distance from the transmitter to the m'th receiver. Note the receiver indices correspond to receiver rings at different depths on the tool, not azimuth positions. $T_1$ can be quantized to an integer sample index, but $T_{sh}$ has a fractional component that should be accounted for to avoid quantization error. The slow waveform should be interpolated to $t+T_1+T_{sh}$. Now we change the notation and define waveforms for any test rotation angle, $\theta$, fast slowness, $s_1$, and differential slowness, $\delta s = s_2 - s_1$, $$FP^{jF} \equiv S_{f,m}(t_k + T_1) \quad (H30)$$
$$= c_\theta^2 XX_m(t_k+T_1) + s_\theta^2 YY_m(t_k+T_1) -$$
$$s_\theta c_\theta (XY_m(t_k+T_1) + YX_m(t_k+T_1))$$
$$\equiv c_\theta^2 XX^{jF} + s_\theta^2 YY^{jF} - s_\theta c_\theta (XY^{jF} + YX^{jF}),$$

$$SP^{jS} \equiv S_{s,n}(t_k + T_1 + T_{sh}) \quad (H31)$$
$$= s_\theta^2 XX_n(t_k+T_1+T_{sh}) + c_\theta^2 YY_n(t_k+T_1+T_{sh}) +$$
$$s_\theta c_\theta (XY_n(t_k+T_1+T_{sh}) + YX_n(t_k+T_1+T_{sh}))$$
$$\equiv s_\theta^2 XX^{jS} + c_\theta^2 YY^{jS} + s_\theta c_\theta (XY^{jS} + YX^{jS}),$$

$$FP_\theta^{jF} \equiv c_{2\theta}(XY_m(t_k+T_1) + YX_m(t_k+T_1)) + \quad (H32)$$
$$s_{2\theta}(XX_m(t_k+T_1) - YY_m(t_k+T_1))$$
$$\equiv c_{2\theta}(XY^{jF} + YX^{jF}) + s_{2\theta}(XX^{jF} + YY^{jF}),$$

$$FP_\theta^{jS} \equiv c_{2\theta}(XY_n(t_k+T_1+T_{sh}) + YX_n(t_k+T_1+T_{sh})) + \quad (H33)$$
$$s_{2\theta}(XX_n(t_k+T_1+T_{sh}) - YY_n(t_k+T_1+T_{sh}))$$
$$\equiv c_{2\theta}(XY^{jS} + YX^{jS}) + s_{2\theta}(XX^{jS} + YY^{jS}),$$

$$SP_\theta = -FP_\theta. \quad (H34)$$

Thus $j_F$ and $j_S$ are shorthand notation for the indices in (k,m,n) space used to stack the fast and slow waveforms respectively. Conceptually both $j_F$ and $j_S$ can be functions of all three indices, but in this example $j_F$ is independent of n.

In the literature $FP_\theta$ and $SP_\theta$ are found by taking the derivative of FP and SP with respect to $\theta$ and are called auxiliary principal waves. In reality they are simply proportional to the off-diagonal element of equation (H27). Next we define an objective function whose value is minimized when $$(\theta, s_1, \delta s) = (\phi, s_f, s_s - s_f). \quad (H35)$$

$$O(\theta, s_1, \delta s) = \sum_{k,m,n} 4(SP^{jS} - FP^{jF})^2 + (SP_\theta^{jS} - FP_\theta^{jF})^2,$$

where m and n are summed over the receiver indices and k is summed over a time window $0 \le k\Delta t \le T_w$. Substituting from equations (H30-H34) we have $$O(\theta, s_1, \delta s) = \sum_{k,m,n} \left\{ 4 \begin{bmatrix} c_\theta^2(YY^{jS} - XX^{jF}) + s_\theta^2(XX^{jS} - YY^{jF}) + \\ s_\theta c_\theta (XY^{jS} + YX^{jS} + XY^{jF} + YX^{jF}) \end{bmatrix}^2 + \begin{bmatrix} s_{2\theta}(XX^{jS} - YY^{jS} + XX^{jF} - YY^{jF}) + \\ c_{2\theta}(XY^{jS} + YX^{jS} + XY^{jF} + YX^{jF}) \end{bmatrix}^2 \right\}. \quad H36$$

Substitute the identities $c_\theta^2 = 0.5(1+c_{2\theta})$ and $s_\theta^2 = 0.5(1-c_{2\theta})$ into equation (36) gives $$O(\theta, s_1, \delta s) = \quad (H37)$$

$$\sum_{k,m,n} \left\{ \begin{bmatrix} \begin{pmatrix} YY^{jS} - XX^{jF} + \\ XX^{jS} - YY^{jF} \end{pmatrix} + c_{2\theta} \begin{pmatrix} YY^{jS} - XX^{jF} - \\ XX^{jS} + YY^{jF} \end{pmatrix} + \\ s_{2\theta}(XY^{jS} + YX^{jS} + XY^{jF} + YX^{jF}) + \end{bmatrix}^2 + \begin{bmatrix} s_{2\theta} \begin{pmatrix} XX^{jS} - YY^{jS} + \\ XX^{jF} - YY^{jF} \end{pmatrix} + c_{2\theta} \begin{pmatrix} XY^{jS} + YX^{jS} + \\ XY^{jF} + YX^{jF} \end{pmatrix} \end{bmatrix}^2 \right\}$$

We can further define $j(k,m,n)=(j_F(k,m,n), j_S(k,m,n))$. Using this compact notation we have $$O(\theta, s_1, \delta s) = \sum_j \{[a_j + c_{2\theta} b_j + s_{2\theta} c_j]^2 + [-s_{2\theta} b_j + c_{2\theta} c_j]^2\} \quad (H38)$$
$$= a^2 + b^2 c_{2\theta}^2 + c^2 s_{2\theta}^2 + 2\vec{a} \cdot \vec{b} c_{2\theta} + 2\vec{a} \cdot \vec{c} s_{2\theta} +$$
$$2\vec{b} \cdot \vec{c} s_{2\theta} c_{2\theta} + b^2 s_{2\theta}^2 + c^2 c_{2\theta}^2 - 2\vec{b} \cdot \vec{c} s_{2\theta} c_{2\theta}$$
$$= a^2 + b^2 + c^2 + 2\vec{a} \cdot \vec{b} c_{2\theta} + 2\vec{a} \cdot \vec{c} s_{2\theta}.$$

where $a_j = YY^{jS} - XX^{jF} + XX^{jS} - YY^{jF},$ (H39)
$b_j = YY^{jS} - XX^{jF} - XX^{jS} + YY^{jF},$
$c_j = XY^{jS} + YX^{jS} + XY^{jF} + YX^{jF}.$ Minimizing with respect to $\theta$ gives $$\vec{a} \cdot \vec{b} s_{2\phi} - \vec{a} \cdot \vec{c} c_{2\phi} = 0 \Rightarrow \tan(2\phi) = \frac{\vec{a} \cdot \vec{c}}{\vec{a} \cdot \vec{b}}. \quad (H40)$$

Figure 18:
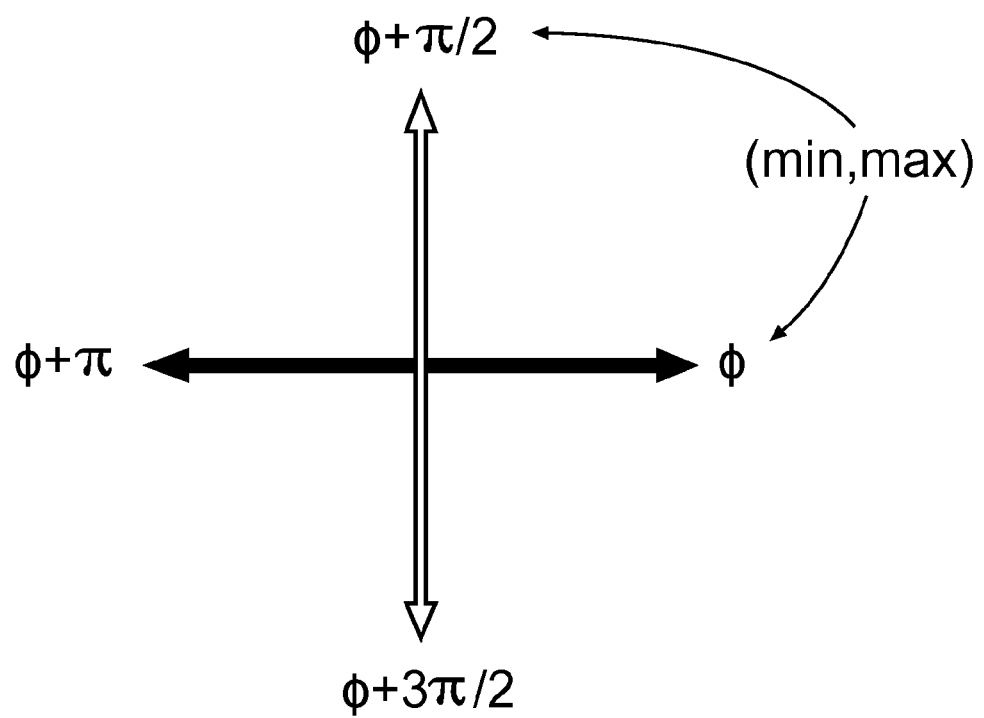
FIG. 18 is a representation of ambiguities with respect to azimuthal angle according to various embodiments of the invention.

If we define φ as the angle of the fast axis relative to the X transmitter then φ→-φ in equation (40). φ is ambiguous by a multiple of π/2, (φ→φ+nπ/2) as shown in FIG. 18. The π ambiguity is not of concern. It has no physical significance. The π/2 ambiguity corresponds to a minimum and a maximum of the objective function. We want the minimum. This is determined by substituting φ and φ+π/2 back into the objective function equation (H38) and selecting the angle that minimizes the objective function. This gives an angle for every fast slowness, $s_1$, and differential slowness, $\delta s = s_2 - s_1 > 0$. The global minimization is done by numerically minimizing over $s_1$ and δs. The fast/slow ambiguity is automatically resolved by restricting δs to positive values. As a QC check we can minimize the cross-line energy only without slowness stacking. Then the objective function is (see equation (H27))

$$O(\theta) = \sum_{k,m} [c_{2\theta}(XY_m(t_k + T_s) + YX_m(t_k + T_s)) + \qquad (H41)$$

$$s_{2\theta}(XX_m(t_k + T_s) - YY_m(t_k + T_s))]^2$$

$$= \sum_{j=(k,m)} (c_{2\theta}(XY^j + YX^j) + s_{2\theta}(XX^j - YY^j))^2$$

$$\equiv c_{2\theta}^2 a^2 + s_{2\theta}^2 b^2 + 2s_{2\theta} c_{2\theta} \vec{a} \cdot \vec{b},$$

where $a_j = XY^j + XY^j,$ $b_j = XX^j - YY^j.$  (H42)

Minimizing with respect to θ gives $$s_{4\phi}(b^2 - a^2) + 2c_{4\phi} \vec{a} \cdot \vec{b} = 0 \Rightarrow \tan(4\phi) = -\frac{2\vec{a} \cdot \vec{b}}{(b^2 - a^2)}. \qquad (H43)$$

If we define φ as the angle of the fast axis relative to the X transmitter then φ→-φ in equation (40). φ is ambiguous by a multiple of π/4, (φ→φ+nπ/4) as in FIG. 16. The π ambiguity is of no concern. It has no physical significance. The π/4 ambiguity corresponds to a minimum and a maximum of the objective function. We want the minimum. This is determined by substituting φ and φ+π/4 back into the objective function of equation (41) and selecting the angle that minimizes the objective function. This leaves the φ and φ+π/2 ambiguity corresponding to the fast and slow formation axes. This is resolved by rotating the cross-dipole waveforms by φ into the fast and slow waveforms using equation (H27) and comparing there slowness. One simple way to do this is to plot them and compare their delay. If the assumed fast waveform lags the assumed slow waveform then the correct angle is φ+π/2. The ratio of cross-line energy after rotation to cross-line energy before rotation is $E = (c_{2\theta}^2 a^2 + s_{2\theta}^2 b^2 + 2s_{2\theta} c_{2\theta} \vec{a} \cdot \vec{b})/a^2.$  (H44)

As an aside, if we started with the sum of the squares of the off-diagonal elements of equation (H25) instead of equation (H27), we arrive at the same result.

One issue with the objective function given in equation (H35) is the possibility of the cross-line term vanishing not because $SP_\theta^{jF}$ and $SP_\theta^{jS}$ are both small, but rather because they are 180° out of phase, i.e., $SP_\theta^{jF} \approx -SP_\theta^{jS} \neq 0$. The algorithm has been tested on many data sets and the angle estimate is correct despite this potential problem. However, the slowness values appear to be off. This could be due to dispersion or the out of phase problem. It doesn't matter because the angles are accurate and the slownesses are recomputed from the rotated waveforms. An alternative objective function that avoids the out of phase problem is $$O(\theta, s_1, \delta s) = \sum_{k,m,n} 4(SP^{js} - FP^{jF})^2 + (SP_\theta^{js})^2 + (FP_\theta^{jF})^2. \qquad (H45)$$

This objective function can be minimized analytically, but it requires solving a fourth order polynomial in $c_{2\theta}$. The equations get quite messy and are given in the HTI Appendix.

Now we will derive the frequency domain algorithm equations. The objective function is $$O(\theta, \omega_{ST}) = \sum_{j_n, j_m}^{B(\omega_{ST}, W)} |T_\theta^T X^{j_n} T_\theta - D^{jm} Z_{est}^{m-n}|_{kl}^2. \qquad (H46)$$

In equation (H46), $j_n = (n,\omega)$ and $j_m = (m,\omega)$ where m and n are receiver indices, and the frequency summation is over a frequency band starting at $\omega_{ST}$ with width W. $T_\theta$ is given by equation (H13), $$T_\theta = \begin{bmatrix} c_\theta & s_\theta \\ -s_\theta & c_\theta \end{bmatrix}.$$

The Fourier transformed cross-dipole waveform is $$X^{jn} = \begin{bmatrix} XX_n(\omega) & XY_n(\omega) \\ YX_n(\omega) & YY_n(\omega) \end{bmatrix}, \qquad (H47)$$

where n is receiver index. The diagonal matrix $D^{jn}$ is computed by diagonalizing the cross-dipole waveform of equation (H47) with a unitary transformation. It is an estimate of the fast and slow waveforms in the frequency domain at receiver n, $$U' X^{jn} U = \begin{bmatrix} D_{11}^{jn} & 0 \\ 0 & D_{22}^{jn} \end{bmatrix}. \qquad (H48)$$

Using methods described herein we can ensure that the $D_{11}$ element is the fast wave and the $D_{22}$ element is the slow wave. The diagonal matrix $Z_{est}$ is given by $$Z_{est} = \begin{bmatrix} z_1 & 0 \\ 0 & z_2 \end{bmatrix}. \qquad (H49)$$

A method for calculating $Z_{est}$ is described in earlier sections. The diagonal matrix $Z_{est}^{m-n}$ ($Z_{est}$ raised to the m–n power) propagates the matrix $D^{jm}$ at receiver m to the matrix $D^{jn}$ at receiver n. We simplify the notation by defining $j = (j_m, j_n)$, then $$O(\theta, \omega_{ST}) = \sum_{j,k,l} |(T_\theta^T X^j T_\theta - \Delta^j)_{kl}|^2, \quad (H50)$$

where $$X^j = X^{jn}, \quad (H51)$$
$$\Delta^j = D^{jm} Z_{est}^{m-n}.$$

The rotated waveforms are given by equation (H27)

$$T_\theta^T X^j T_\theta = \begin{bmatrix} \begin{pmatrix} c_\theta^2 XX^j + s_\theta^2 YY^j - \\ s_\theta c_\theta (XY^j + YX^j) \end{pmatrix} & 0.5\begin{pmatrix} c_{2\theta}(XY^j + YX^j) + \\ s_{2\theta}(XX^j - YY^j) \end{pmatrix} \\ 0.5\begin{pmatrix} c_{2\theta}(XY^j + YX^j) + \\ s_{2\theta}(XX^j - YY^j) \end{pmatrix} & \begin{pmatrix} s_\theta^2 XX^j + c_\theta^2 YY^j + \\ s_\theta c_\theta (XY^j + YX^j) \end{pmatrix} \end{bmatrix} \quad (H52)$$

Working through the algebra we have $$O(\theta, \omega_{ST}) = \sum_j \begin{Bmatrix} |c_\theta^2 XX^j + s_\theta^2 YY^j - s_\theta c_\theta(XY^j + YX^j) - \Delta_{11}^j|^2 - \\ |s_\theta^2 XX^j + c_\theta^2 YY^j + s_\theta c_\theta(XY^j + YX^j) - \Delta_{22}^j|^2 - \\ 0.5 \cdot |c_{2\theta}(XY^j + YX^j) + s_{2\theta}(XX^j - YY^j)|^2 \end{Bmatrix} \quad (H53)$$

$$= \sum_j \begin{Bmatrix} |c_\theta^2 XX^j + s_\theta^2 YY^j - s_\theta c_\theta(XY^j + YX^j)|^2 + \\ |\Delta_{11}^j|^2 - 2\text{Re}[\Delta_{11}^j(c_\theta^2 XX^j + s_\theta^2 YY^j - s_\theta c_\theta(XY^j + \\ YX^j))^*] + |s_\theta^2 XX^j + c_\theta^2 YY^j + s_\theta c_\theta(XY^j + \\ YX^j)|^2 + |\Delta_{22}^j|^2 - 2\text{Re}[\Delta_{22}^j(s_\theta^2 XX^j + c_\theta^2 YY^j + \\ s_\theta c_\theta(XY^j + YX^j))^*] + 0.5 \cdot \\ (c_{2\theta}^2|XY^j + YX^j|^2 + s_{2\theta}^2|XX^j - YY^j|^2 + \\ 2s_{2\theta}c_{2\theta}\text{Re}[(XY^j + YX^j)(XX^j - YY^j)^*]) \end{Bmatrix}$$

Substitute the identities $c_\theta^2 = 0.5(1+c_{2\theta})$ and $s_\theta^2 = 0.5(1-c_{2\theta})$ into equation (H53) gives $$O(\theta, \omega_{ST}) = \sum_j \begin{Bmatrix} |0.5(XX^j + YY^j) + 0.5c_{2\theta}(XX^j - YY^j) - \\ 0.5s_{2\theta}(XY^j + YX^j)|^2 + |\Delta_{11}^j|^2 - \\ 2\text{Re}[\Delta_{11}^j(c_\theta^2 XX^j + s_\theta^2 YY^j - s_\theta c_\theta(XY^j + \\ YX^j))^*] + |0.5(XX^j + YY^j) - \\ 0.5c_{2\theta}(XX^j - YY^j) + 0.5s_{2\theta}(XY^j + YX^j)|^2 + \\ |\Delta_{22}^j|^2 - 2\text{Re}[\Delta_{22}^j(s_\theta^2 XX^j + c_\theta^2 YY^j + \\ s_\theta c_\theta(XY^j + YX^j))^*] + 0.5 \cdot (c_{2\theta}^2|XY^j + YX^j|^2 + \\ s_{2\theta}^2|XX^j - YY^j|^2 + 2s_{2\theta}c_{2\theta}\text{Re}[(XY^j + YX^j) \\ (XX^j - YY^j)^*]) \end{Bmatrix} \quad (H54)$$

$$= \sum_j \begin{Bmatrix} 0.5(|XX^j + YY^j|^2 + c_{2\theta}^2|XX^j - YY^j|^2 + \\ s_{2\theta}^2|XY^j + YX^j|^2 - 2s_{2\theta}c_{2\theta}\text{Re}[(XX^j - YY^j) \\ (XY^j + YX^j)^*]) + |\Delta_{11}^j|^2 - 2\text{Re}[\Delta_{11}^j(c_\theta^2 XX^j + \\ s_\theta^2 YY^j - s_\theta c_\theta(XY^j + YX^j))^*] + |\Delta_{22}^j|^2 - \\ 2\text{Re}[\Delta_{22}^j(s_\theta^2 XX^j + c_\theta^2 YY^j + \\ s_\theta c_\theta(XY^j + YX^j))^*] + \\ 0.5 \cdot (c_{2\theta}^2|XY^j + YX^j|^2 + s_{2\theta}^2|XX^j - YY^j|^2 + \\ 2s_{2\theta}c_{2\theta}\text{Re}[(XY^j + YX^j)(XX^j - YY^j)^*]) \end{Bmatrix}$$

-continued $$= \sum_j \begin{Bmatrix} 0.5(|XX^j + YY^j|^2 + |XX^j - YY^j|^2 + \\ |XY^j + YX^j|^2) + |\Delta_{11}^j|^2 - 2\text{Re}[\Delta_{11}^j(c_\theta^2 XX^j + \\ s_\theta^2 YY^j - s_\theta c_\theta(XY^j + YX^j))^*] + |\Delta_{22}^j|^2 - \\ 2\text{Re}[\Delta_{22}^j(s_\theta^2 XX^j + c_\theta^2 YY^j + s_\theta c_\theta(XY^j + YX^j))^*] \end{Bmatrix}.$$

Differentiating with respect to $\theta$ yields $$\sum_j \text{Re}[s_{2\theta}\Delta_{11}^j((YY^j - XX^j) - c_{2\theta}(XY^j + YX^j))^*] - \quad (H55)$$
$$\text{Re}[s_{2\theta}\Delta_{22}^j((YY^j - XX^j) - c_{2\theta}(XY^j + YX^j))^*] = 0.$$

Rearranging gives $$s_{2\theta}\text{Re}[(\Delta_{22}^j - \Delta_{11}^j)(YY^j - XX^j)^*] - c_{2\theta}\text{Re}[(\Delta_{22}^j - \Delta_{11}^j)(XY^j + YX^j)^*] = 0. \quad (H56)$$

Define $$d_j = \Delta_{22}^j - \Delta_{11}^j, a_j = XY^j + YX^j, b_j = YY^j - XX^j \quad (H57)$$

to get $$\tan(2\phi) = \frac{\text{Re}[\vec{a}^* \cdot \vec{d}]}{\text{Re}[\vec{b}^* \cdot \vec{d}]}. \quad (H58)$$

If we define $\phi$ as the angle of the fast axis relative to the X transmitter then $\phi \to -\phi$ in equation (H58). $\phi$ is ambiguous by a multiple of $\pi/2$. This is handled the same way as noted previously.

Now we will move on to the general Alford rotation version of the algorithms. There are many ways to do this. First we need to take care of some notation since we are running out of letters. The generalized Alford rotation equations denoted different 2×2 waveforms by the indices (m.n) $\in \{(0,1),(0,2),(0,3),(1,2),(1,3),(2,3)\}$. From now on this ordered set of indices will be denoted by a letter with subscript A. Letters without subscript A refer to receiver ring positions. For the 4 dipole receiver case we define $$n_A = 1 \to (m.n) = (0,1),$$
$$n_A = 2 \to (m.n) = (0,2),$$
$$n_A = 3 \to (m.n) = (0,3),$$
$$n_A = 4 \to (m.n) = (1,2),$$
$$n_A = 5 \to (m.n) = (1,3),$$
$$n_A = 6 \to (m.n) = (2,3). \quad (H59)$$

Then the generalized Alford rotation equations look like this, $$T_\phi^T X^{n_A} T_\phi = \begin{bmatrix} S_f & 0 \\ 0 & S_s \end{bmatrix}, \quad (H60)$$

where $$X^{n_A} = \begin{bmatrix} X_{11}^{n_A} & X_{12}^{n_A} \\ X_{21}^{n_A} & X_{22}^{n_A} \end{bmatrix} = \begin{bmatrix} X_{n(n_A)} & X_{m(n_A)} \\ Y_{n(n_A)} & Y_{m(n_A)} \end{bmatrix} \{I - c_{(\theta n(n_A) - \theta m(n_A))}P\}$$

$$T^{n(n_A)m(n_A)},$$

$$T^{n(n_A)m(n_A)} = \begin{bmatrix} c_{\theta n(n_A)} & s_{\theta n(n_A)} \\ c_{\theta m(n_A)} & s_{\theta m(n_A)} \end{bmatrix} \Big/ s^2_{(\theta n(n_A) - \theta m(n_A))}.$$ (H61)

The general cross-dipole waveforms obey the same rules as the classic cross-dipole waveforms, $$\begin{bmatrix} X^{n_A}_{11} & X^{n_A}_{12} \\ X^{n_A}_{21} & X^{n_A}_{22} \end{bmatrix} = \begin{bmatrix} c_\phi & s_\phi \\ -s_\phi & c_\phi \end{bmatrix} \begin{bmatrix} S_f & 0 \\ 0 & S_s \end{bmatrix} \begin{bmatrix} c_\phi & -s_\phi \\ s_\phi & c_\phi \end{bmatrix}$$ (H62)

$$= \begin{bmatrix} c_\phi & s_\phi \\ -s_\phi & c_\phi \end{bmatrix} \begin{bmatrix} S_f c_\phi & -S_f s_\phi \\ S_s s_\phi & S_s c_\phi \end{bmatrix}$$

$$= \begin{bmatrix} S_f c_\phi^2 + S_s s_\phi^2 & (S_s - S_f) s_\phi c_\phi \\ (S_s - S_f) s_\phi c_\phi & S_f s_\phi^2 + S_s c_\phi^2 \end{bmatrix}, \text{ and}$$

$$\begin{bmatrix} S_f & 0 \\ 0 & S_s \end{bmatrix} = \begin{bmatrix} (c_\phi^2 X^{n_A}_{11} + s_\phi^2 X^{n_A}_{22} - s_\phi c_\phi (X^{n_A}_{12} + X^{n_A}_{21})) & 0.5(c_{2\phi}(X^{n_A}_{12} + X^{n_A}_{21}) + s_{2\phi}(X^{n_A}_{11} - X^{n_A}_{22})) \\ 0.5(c_{2\phi}(X^{n_A}_{12} + X^{n_A}_{21}) + s_{2\phi}(X^{n_A}_{11} - X^{n_A}_{22})) & (s_\phi^2 X^{n_A}_{11} + c_\phi^2 X^{n_A}_{22} + s_\phi c_\phi (X^{n_A}_{12} + X^{n_A}_{21})) \end{bmatrix}$$ (H63)

A simple way to modify the algorithms is to redefine the generalized stacking index, j, to include the index $n_A$ of the generalized cross-dipole waveform. Then the solution for the angle has the same form. Thus for the time domain algorithm $$\tan(2\phi) = \frac{\vec{a} \cdot \vec{c}}{\vec{a} \cdot \vec{b}}.$$ (H64)

The generalized objective function is $$O(\theta, s_1, \delta s) = \sum_{\substack{k,m,n \\ m_A, n_A}} 4(SP^{m_A, jS} - FP^{n_A, jF})^2 + (SP_\theta^{m_A, jS} - FP_\theta^{n_A, jF})^2$$ (H65)

We re-define $j(k,m,n,m_A,n_A) = ((j_F(k,m,n),m_A), (j_S(k,m,n), n_A))$. Using this compact notation we have (see equation (H38)), $$O(\theta, s_1, \delta s) = \sum_j \{[a_j + c_{2\theta} b_j + s_{2\theta} c_j]^2 + [-s_{2\theta} b_j + c_{2\theta} c_j]^2\}$$ (H66)

$$= a^2 + b^2 c_{2\theta}^2 + c^2 s_{2\theta}^2 + 2\vec{a} \cdot \vec{b} c_{2\theta} + 2\vec{a} \cdot \vec{c} s_{2\theta} +$$

$$2\vec{b} \cdot \vec{c} s_{2\theta} c_{2\theta} + b^2 s_{2\theta}^2 + c^2 c_{2\theta}^2 - 2\vec{b} \cdot \vec{c} s_{2\theta} c_{2\theta}$$

$$= a^2 + b^2 + c^2 + 2\vec{a} \cdot \vec{b} c_{2\theta} + 2\vec{a} \cdot \vec{c} s_{2\theta}.$$

where $a_j = X_{22}^{m_A, jS} - X_{11}^{n_A, jF} + X_{11}^{m_A, jS} - X_{22}^{n_A, jF}$, $b_j = X_{22}^{m_A, jS} - X_{11}^{n_A, jF} - X_{11}^{m_A, jS} + X_{22}^{n_A, jF}$, $c_j = X_{12}^{m_A, jS} + X_{21}^{m_A, jS} + X_{12}^{n_A, jF} + X_{21}^{n_A, jF}$. (H67)

There are many ways to incorporate the generalized waveforms. A less computationally intensive version is $$O(\theta, s_1, \delta s) = \sum_{\substack{k,m,n \\ m_A}} 4(SP^{m_A, jS} - FP^{m_A, jF})^2 + (SP_\theta^{m_A, jS} - FP_\theta^{m_A, jF})^2,$$ (H68)

in which case $a_j = X_{22}^{m_A, jS} - X_{11}^{m_A, jF} + X_{11}^{m_A, jS} - X_{22}^{m_A, jF}$, $b_j = X_{22}^{m_A, jS} - X_{11}^{m_A, jF} - X_{11}^{m_A, jS} + X_{22}^{m_A, jF}$, $c_j = X_{12}^{m_A, jS} + X_{21}^{m_A, jS} + X_{12}^{m_A, jF} + X_{21}^{m_A, jF}$. (H68)

An extension of the frequency domain algorithm is $$O(\theta, \omega_{ST}) = \sum_{\substack{j_n, j_m \\ m_A, n_A \\ k,l}}^{B(\omega_{ST}, W)} |(T_\theta^T X^{m_A, j_n} T_\theta - D^{n_A, j_m} Z_{est, n_A}^{m-n})_{kl}|^2$$ (H70)

$$= \sum_{j,k,l} |(T_\theta^T X^j T_\theta - \Delta^j)_{kl}|^2,$$

where $X^j = X^{m_A, j_n}$, $\Delta^j = D^{n_A, j_m} Z_{est, n_A}^{m-n}$. (H71)

The solution is $$\tan(2\phi) = \frac{\text{Re}[\vec{a}^* \cdot \vec{d}]}{\text{Re}[\vec{b}^* \cdot \vec{d}]},$$ (H72)

where $d_j = \Delta_{22}^{n_A, j_m} - \Delta_{11}^{n_A, j_m}, a_j = X_{12}^{m_A, j_n} + X_{21}^{m_A, j_n} + X_{21}^{m_A, j_n}$,
$b_j = X_{22}^{m_A, j_n}$. (H73)

An alternative embodiment of a frequency domain algorithm is $$O(\theta, \omega_{ST}) = \sum_{\substack{j_n \\ m_A \neq n_A}}^{B(\omega_{ST}, W)} \sum_k |(T_\theta^T (X^{m_A, j_n} - X^{n_A, j_n}) T_\theta)_{kk}|^2 +$$ (H74)

$$\sum_{k \neq l} \{|(T_\theta^T X^{m_A, j_n} T_\theta)_{kl}|^2 + |(T_\theta^T X^{n_A, j_n} T_\theta)_{kl}|^2\}$$

Dropping the $j_n$ subscript for convenience, and substituting from equation (H63) we have $$O(\theta, \omega_{ST}) = \qquad (H75)$$

$$\sum_{\substack{j_n \\ m_A \neq n_A}}^{B(\omega_{ST}, W)} \left\{ \begin{array}{l} \left| \begin{array}{l} c_\theta^2(X_{11}^{m_A} - X_{11}^{n_A}) + s_\theta^2(X_{22}^{m_A} - X_{22}^{n_A}) - \\ s_\theta c_\theta(X_{12}^{m_A} + X_{21}^{n_A} - X_{12}^{n_A} - X_{21}^{n_A}) \end{array} \right|^2 + \\ \left| \begin{array}{l} s_\theta^2(X_{11}^{m_A} - X_{11}^{n_A}) + c_\theta^2(X_{22}^{m_A} - X_{22}^{n_A}) + \\ s_\theta c_\theta(X_{12}^{m_A} + X_{21}^{m_A} - X_{12}^{n_A} - X_{21}^{n_A}) \end{array} \right|^2 + \\ 0.5 \cdot |c_{2\theta}(X_{12}^{m_A} + X_{21}^{m_A}) + s_{2\theta}(X_{11}^{m_A} - X_{22}^{m_A})|^2 + \\ 0.5 \cdot |c_{2\theta}(X_{12}^{n_A} + X_{21}^{n_A}) + s_{2\theta}(X_{11}^{n_A} - X_{22}^{n_A})|^2 \end{array} \right\}$$

Substitute the identities $c_\theta^2 = 0.5(1 + c_{2\theta})$ and $s_\theta^2 = 0.5(1 - c_{2\theta})$ into equation (H75) gives $$O(\theta, \omega_{ST}) = \qquad (H76)$$

$$0.25 \cdot \sum_{\substack{j_n \\ m_A \neq n_A}}^{B(\omega_{ST}, W)} \left\{ \begin{array}{l} |(1 + c_{2\theta})(X_{11}^{m_A} - X_{11}^{n_A}) + (1 - c_{2\theta}) \\ (X_{22}^{m_A} - X_{22}^{n_A}) - s_{2\theta}(X_{12}^{m_A} + \\ X_{21}^{m_A} - X_{12}^{n_A} - X_{21}^{n_A})|^2 + \\ |(1 - c_{2\theta})(X_{11}^{m_A} - X_{11}^{n_A}) + (1 + c_{2\theta}) \\ (X_{22}^{m_A} - X_{22}^{n_A}) + s_{2\theta}(X_{12}^{m_A} + \\ X_{21}^{m_A} - X_{12}^{n_A} - X_{21}^{n_A})|^2 + \\ 2 \cdot |c_{2\theta}(X_{12}^{m_A} + X_{21}^{m_A}) + s_{2\theta}(X_{11}^{m_A} - X_{22}^{m_A})|^2 + \\ 2 \cdot |c_{2\theta}(X_{12}^{n_A} + X_{21}^{n_A}) + s_{2\theta}(X_{11}^{n_A} - X_{22}^{n_A})|^2 \end{array} \right\} =$$

$$0.25 \cdot \sum_{\substack{j_n \\ m_A \neq n_A}}^{B(\omega_{ST}, W)} \left\{ \begin{array}{l} \left| \begin{array}{l} (X_{11}^{m_A} - X_{11}^{n_A} + X_{22}^{m_A} - X_{22}^{n_A}) + \\ c_{2\theta}(X_{11}^{m_A} - X_{11}^{n_A} + X_{22}^{m_A} - X_{22}^{n_A}) - \\ s_{2\theta}(X_{12}^{m_A} + X_{21}^{m_A} - X_{12}^{n_A} - X_{21}^{n_A}) \end{array} \right|^2 + \\ \left| \begin{array}{l} (X_{11}^{m_A} - X_{11}^{n_A} + X_{22}^{m_A} - X_{22}^{n_A}) - \\ c_{2\theta}(X_{11}^{m_A} - X_{11}^{n_A} + X_{22}^{m_A} - X_{22}^{n_A}) + \\ s_{2\theta}(X_{12}^{m_A} + X_{21}^{m_A} - X_{12}^{n_A} - X_{21}^{n_A}) \end{array} \right|^2 \\ 2 \cdot (c_{2\theta}^2(|X_{12}^{m_A} + X_{21}^{m_A}|^2 + |X_{12}^{n_A} + X_{21}^{n_A}|^2) + \\ s_{2\theta}^2(|X_{11}^{m_A} - X_{22}^{m_A}|^2 + |X_{11}^{n_A} - X_{22}^{n_A}|^2)) + \\ 4 \cdot s_{2\theta} c_{2\theta} \text{Re}[(X_{12}^{m_A} + X_{21}^{m_A})^*(X_{11}^{m_A} - X_{22}^{m_A}) + \\ (X_{12}^{n_A} + X_{21}^{n_A})^*(X_{11}^{n_A} - X_{22}^{n_A})] \end{array} \right\} =$$

$$0.25 \cdot \sum_{\substack{j_n \\ m_A \neq n_A}}^{B(\omega_{ST}, W)} \left\{ \begin{array}{l} 2 \cdot |X_{11}^{m_A} - X_{11}^{n_A} + X_{22}^{m_A} - X_{22}^{n_A}|^2 + \\ 2 \cdot c_{2\theta}^2 |X_{11}^{m_A} - X_{11}^{n_A} - X_{22}^{m_A} + X_{22}^{n_A}|^2 + \\ 2 \cdot s_{2\theta}^2 |X_{12}^{m_A} + X_{21}^{m_A} - X_{12}^{n_A} - X_{21}^{n_A}|^2 - \\ 4 \cdot s_{2\theta} c_{2\theta} \text{Re}[(X_{11}^{m_A} - X_{11}^{n_A} - X_{22}^{m_A} + \\ X_{22}^{n_A})^*(X_{12}^{m_A} + X_{21}^{m_A} - X_{12}^{n_A} - X_{21}^{n_A})] + 2 \cdot \\ (c_{2\theta}^2(|X_{12}^{m_A} + X_{21}^{m_A}|^2 + |X_{12}^{n_A} + X_{21}^{n_A}|^2) + \\ s_{2\theta}^2(|X_{11}^{m_A} - X_{22}^{m_A}|^2 + |X_{11}^{n_A} - X_{22}^{n_A}|^2)) + \\ 4 \cdot s_{2\theta} c_{2\theta} \text{Re}[(X_{12}^{m_A} + X_{21}^{m_A})^* \\ (X_{11}^{m_A} - X_{22}^{m_A}) + (X_{12}^{n_A} + X_{21}^{n_A})^* \\ (X_{11}^{n_A} - X_{22}^{n_A})] \end{array} \right\} =$$

-continued $$\sum_{\substack{j_n \\ m_A \neq n_A}}^{B(\omega_{ST}, W)} \left\{ \begin{array}{l} 0.5 \cdot |X_{11}^{m_A} - X_{11}^{n_A} + X_{22}^{m_A} - X_{22}^{n_A}|^2 + \\ 0.5 \cdot c_{2\theta}^2(|X_{11}^{m_A} - X_{22}^{m_A}|^2 + |X_{11}^{n_A} - X_{22}^{n_A}|^2 - \\ 2 \cdot \text{Re}[(X_{11}^{m_A} - X_{22}^{m_A})^*(X_{11}^{n_A} - X_{22}^{n_A})]) + \\ 0.5 \cdot s_{2\theta}^2(|X_{12}^{m_A} + X_{21}^{m_A}|^2 + |X_{12}^{n_A} + X_{21}^{n_A}|^2 - \\ 2 \cdot \text{Re}[(X_{12}^{m_A} + X_{21}^{m_A})^*(X_{12}^{n_A} + X_{21}^{n_A})]) - \\ s_{2\theta} c_{2\theta} \text{Re}[(X_{11}^{m_A} - X_{11}^{n_A} - X_{22}^{m_A} + X_{22}^{n_A})^* \\ (X_{12}^{m_A} + X_{21}^{m_A} - X_{12}^{n_A} - X_{21}^{n_A})] + \\ 0.5 \cdot (c_{2\theta}^2(|X_{12}^{m_A} + X_{21}^{m_A}|^2 + |X_{12}^{n_A} + X_{21}^{n_A}|^2) + \\ s_{2\theta}^2(|X_{11}^{m_A} - X_{22}^{m_A}|^2 + |X_{11}^{n_A} - X_{22}^{n_A}|^2)) + \\ s_{2\theta} c_{2\theta} \text{Re}[(X_{12}^{m_A} + X_{21}^{m_A})^*(X_{11}^{m_A} - X_{22}^{m_A}) + \\ (X_{12}^{n_A} + X_{21}^{n_A})^*(X_{11}^{n_A} - X_{22}^{n_A})] \end{array} \right\} =$$

$$\sum_{\substack{j_n \\ m_A \neq n_A}}^{B(\omega_{ST}, W)} \left\{ \begin{array}{l} 0.5 \cdot \left( \begin{array}{l} |X_{11}^{m_A} - X_{11}^{n_A} + X_{22}^{m_A} - X_{22}^{n_A}|^2 + \\ |X_{11}^{m_A} - X_{22}^{m_A}|^2 + |X_{11}^{n_A} - X_{22}^{n_A}|^2 + \\ |X_{12}^{m_A} + X_{21}^{m_A}|^2 + |X_{12}^{n_A} + X_{21}^{n_A}|^2 \end{array} \right) - \\ c_{2\theta}^2 \text{Re}[(X_{11}^{m_A} - X_{22}^{m_A})^*(X_{11}^{n_A} - X_{22}^{n_A})] - \\ s_{2\theta}^2 \text{Re}[(X_{12}^{m_A} + X_{21}^{m_A})^*(X_{12}^{n_A} + X_{21}^{n_A})] - \\ s_{2\theta} c_{2\theta} \text{Re}[(X_{11}^{m_A} - X_{11}^{n_A} - X_{22}^{m_A} + X_{22}^{n_A})^* \\ (X_{12}^{m_A} + X_{21}^{m_A} - X_{12}^{n_A} - X_{21}^{n_A})] + \\ s_{2\theta} c_{2\theta} \text{Re}[(X_{12}^{m_A} + X_{21}^{m_A})^*(X_{11}^{m_A} - X_{22}^{m_A}) + \\ (X_{12}^{n_A} + X_{21}^{n_A})^*(X_{11}^{n_A} - X_{22}^{n_A})] \end{array} \right\} =$$

$$\sum_{\substack{j_n \\ m_A \neq n_A}}^{B(\omega_{ST}, W)} \left\{ \begin{array}{l} 0.5 \cdot \left( \begin{array}{l} |X_{11}^{m_A} - X_{11}^{n_A} + X_{22}^{m_A} - X_{22}^{n_A}|^2 + \\ |X_{11}^{m_A} - X_{22}^{m_A}|^2 + |X_{11}^{n_A} - X_{22}^{n_A}|^2 + \\ |X_{12}^{m_A} + X_{21}^{m_A}|^2 + |X_{12}^{n_A} + X_{21}^{n_A}|^2 \end{array} \right) - \\ c_{2\theta}^2 \text{Re}[(X_{11}^{m_A} - X_{22}^{m_A})^*(X_{11}^{n_A} - X_{22}^{n_A})] - \\ s_{2\theta}^2 \text{Re}[(X_{12}^{m_A} + X_{21}^{m_A})^*(X_{12}^{n_A} + X_{21}^{n_A})] - \\ s_{2\theta} c_{2\theta} \text{Re}[((X_{11}^{m_A} - X_{22}^{m_A}) - (X_{11}^{n_A} - X_{22}^{n_A}))^* \\ ((X_{12}^{m_A} + X_{21}^{m_A}) - (X_{12}^{n_A} + X_{21}^{n_A}))] + \\ s_{2\theta} c_{2\theta} \text{Re}[(X_{12}^{m_A} + X_{21}^{m_A})^*(X_{11}^{m_A} - X_{22}^{m_A}) + \\ (X_{12}^{n_A} + X_{21}^{n_A})^*(X_{11}^{n_A} - X_{22}^{n_A})] \end{array} \right\} =$$

$$\sum_{\substack{j_n \\ m_A \neq n_A}}^{B(\omega_{ST}, W)} \left\{ \begin{array}{l} 0.5 \cdot \left( \begin{array}{l} |X_{11}^{m_A} - X_{11}^{n_A} + X_{22}^{m_A} - X_{22}^{n_A}|^2 + \\ |X_{11}^{m_A} - X_{22}^{m_A}|^2 + |X_{11}^{n_A} - X_{22}^{n_A}|^2 + \\ |X_{12}^{m_A} + X_{21}^{m_A}|^2 + |X_{12}^{n_A} + X_{21}^{n_A}|^2 \end{array} \right) - \\ c_{2\theta}^2 \text{Re}[(X_{11}^{m_A} - X_{22}^{m_A})^*(X_{11}^{n_A} - X_{22}^{n_A})] - \\ s_{2\theta}^2 \text{Re}[(X_{12}^{m_A} + X_{21}^{m_A})^*(X_{12}^{n_A} + X_{21}^{n_A})] + \\ s_{2\theta} c_{2\theta} \text{Re}[(X_{11}^{m_A} - X_{22}^{m_A})^*(X_{12}^{n_A} + X_{21}^{n_A}) + \\ (X_{11}^{n_A} - X_{22}^{n_A})^*(X_{12}^{m_A} + X_{21}^{m_A})] \end{array} \right\}.$$

Differentiating gives $$0 = \sum_{\substack{j_n \\ m_A \neq n_A}}^{B(\omega_{ST}, W)} \left\{ \begin{array}{l} s_{4\theta}\text{Re}[(X_{11}^{m_A} - X_{22}^{m_A})^*(X_{11}^{n_A} - X_{22}^{n_A}) - (X_{12}^{m_A} + X_{21}^{m_A})^*(X_{12}^{n_A} + X_{21}^{n_A})] + \\ c_{4\theta}\text{Re}[(X_{11}^{m_A} - X_{22}^{m_A})^*(X_{12}^{n_A} + X_{21}^{n_A}) + (X_{11}^{n_A} - X_{22}^{n_A})^*(X_{12}^{m_A} + X_{21}^{m_A})] \end{array} \right\}. \quad \text{(H77)}$$

The solution is $$\tan(4\phi) = -\frac{\text{Re}[\vec{a}^* \cdot \vec{d} + \vec{b}^* \cdot \vec{c}]}{\text{Re}[\vec{a}^* \cdot \vec{b} - \vec{c}^* \cdot \vec{d}]}. \quad \text{(H78)}$$

where $a_j = X_{11}^{m_A} - X_{22}^{m_A},$ $b_j = X_{11}^{n_A} - X_{22}^{n_A},$ $c_j = X_{12}^{m_A} + X_{21}^{m_A},$ $d_j = X_{12}^{n_A} + X_{21}^{n_A}.$ (H79)

and $j = \{m_A, n_A, j_n\}$. See discussion immediately following equation (H43) for handling ambiguity.

HTI Appendix $$O(\theta, s_1, \delta s) = \sum_{k,m,n} \left\{ \begin{array}{l} 4[c_\theta^2(YY^{js} - XX^{jF}) + s_\theta^2(XX^{js} - YY^{jF}) + \\ s_\theta c_\theta(XY^{js} + YX^{js} + XY^{jF} + YX^{jF})]^2 + \\ [s_{2\theta}(XX^{js} - YY^{js}) + c_{2\theta}(XY^{js} + YX^{js})]^2 + \\ [s_{2\theta}(XX^{jF} - YY^{jF}) + c_{2\theta}(XY^{jF} + YX^{jF})]^2 \end{array} \right\} =$$

$$\sum_{k,m,n} \left\{ \begin{array}{l} (1 + c_{2\theta})(YY^{js} - XX^{jF}) + (1 - c_{2\theta})(XX^{js} - YY^{jF}) + \\ s_{2\theta}(XY^{js} + YX^{js} + XY^{jF} + YX^{jF})]^2 + \\ [s_{2\theta}(XX^{js} - YY^{js}) + c_{2\theta}(XY^{js} + YX^{js})]^2 + \\ [s_{2\theta}(XX^{jF} - YY^{jF}) + c_{2\theta}(XY^{jF} + YX^{jF})]^2 \end{array} \right\} =$$

$$\sum_{k,m,n} \left\{ \begin{array}{l} (YY^{js} - XX^{jF} + XX^{js} - YY^{jF}) + \\ c_{2\theta}(YY^{js} - XX^{jF} + XX^{js} - YY^{jF}) + \\ s_{2\theta}(XY^{js} + YX^{js} + XY^{jF} + YX^{jF})]^2 + \\ [s_{2\theta}(XX^{js} - YY^{js}) + c_{2\theta}(XY^{js} + YX^{js})]^2 + \\ [s_{2\theta}(XX^{jF} - YY^{jF}) + c_{2\theta}(XY^{jF} + YX^{jF})]^2 \end{array} \right\} =$$

$$\sum_{k,m,n} \left\{ \begin{array}{l} (YY^{js} - XX^{jF} + XX^{js} - YY^{jF})^2 + \\ c_{2\theta}^2(YY^{js} - XX^{jF} - XX^{js} + YY^{jF})^2 + \\ s_{2\theta}^2(XY^{js} + YX^{js} + XY^{jF} + YX^{jF})^2 + \\ 2(YY^{js} - XX^{jF} + XX^{js} - YY^{jF}) \\ {[c_{2\theta}(YY^{js} - XX^{jF} - XX^{js} + YY^{jF}) + } \\ s_{2\theta}(XY^{js} + YX^{js} + XY^{jF} + YX^{jF})] + \\ 2s_{2\theta}c_{2\theta}(YY^{js} - XX^{jF} - XX^{js} + YY^{jF}) \\ (XY^{js} + YX^{js} + XY^{jF} + YX^{jF}) + \\ s_{2\theta}^2(XX^{js} - YY^{js})^2 + c_{2\theta}^2(XY^{js} + YX^{js})^2 + \\ 2s_{2\theta}c_{2\theta}(XX^{js} - YY^{js})(XY^{js} + YX^{js}) + \\ s_{2\theta}^2(XX^{jF} - YY^{jF})^2 + c_{2\theta}^2(XY^{jF} + YX^{jF})^2 + \\ 2s_{2\theta}c_{2\theta}(XX^{jF} - YY^{jF})(XY^{jF} + YX^{jF}) \end{array} \right\}$$

-continued $$\sum_{k,m,n} \left\{ \begin{array}{l} (YY^{js} - XX^{jF} + XX^{js} - YY^{jF})^2 + \\ c_{2\theta}^2[(YY^{js} - XX^{jF} - XX^{js} + YY^{jF})^2 + \\ (XY^{js} + YX^{js})^2 + (XY^{jF} + YX^{jF})^2] + \\ s_{2\theta}^2[(XY^{js} + YX^{js} + XY^{jF} + YX^{jF})^2 + \\ (XX^{js} - YY^{js})^2 + (XX^{jF} - YY^{jF})^2] + \\ 2(YY^{js} - XX^{jF} + XX^{js} - YY^{jF}) \\ {[c_{2\theta}(YY^{js} - XX^{jF} - XX^{js} + YY^{jF}) + } \\ s_{2\theta}(XY^{js} + YX^{js} + XY^{jF} + YX^{jF})] + \\ 2s_{2\theta}c_{2\theta} \begin{bmatrix} (YY^{js} - XX^{jF} - XX^{js} + YY^{jF}) \\ (XY^{js} + YX^{js} + XY^{jF} + YX^{jF}) + \\ (XX^{js} - YY^{js})(XY^{js} + YX^{js}) + \\ (XX^{jF} - YY^{jF})(XY^{jF} + YX^{jF}) \end{bmatrix} \end{array} \right\}$$

Define $a_{S,j} = YY^{js} + XX^{js}, \quad a_{F,j} = YY^{jF} + XX^{jF},$ $b_{S,j} = YY^{js} - XX^{js}, \quad b_{F,j} = YY^{jF} - XX^{jF},$ $c_{S,j} = XY^{js} + YX^{js}, \quad c_{F,j} = XY^{jF} + YX^{jF}.$ $a_j = YY^{js} - XX^{jF} + XX^{js} - YY^{jF} = a_{S,j} - a_{F,j},$ $b_j = YY^{js} - XX^{jF} - XX^{js} + YY^{jF} = b_{S,j} - b_{F,j},$ $c_j = XY^{js} + YX^{jF} + XY^{js} + YX^{jF} = c_{S,j} - c_{F,j}.$ Then $$O = a^2 + c_{2\theta}^2(b^2 + c_S^2 + c_F^2) + s_{2\theta}^2(c^2 + b_S^2 + b_F^2) +$$

$$2c_{2\theta}\vec{a} \cdot \vec{b} + 2s_{2\theta}\vec{a} \cdot \vec{c} + 2s_{2\theta}c_{2\theta}(\vec{b} \cdot \vec{c} - \vec{b}_S \cdot \vec{c}_S - \vec{b}_F \cdot \vec{c}_F) =$$

$$a^2 + c_{2\theta}^2(b^2 + c^2 - 2\vec{c}_S \cdot \vec{c}_F) + s_{2\theta}^2(c^2 + b^2 - 2\vec{b}_S \cdot \vec{b}_F) + 2c_{2\theta}\vec{a} \cdot \vec{b} +$$

$$2s_{2\theta}\vec{a} \cdot \vec{c} + 2s_{2\theta}c_{2\theta}(\vec{b}_S \cdot \vec{c}_F + \vec{b}_F \cdot \vec{c}_S) = a^2 + b^2 + c^2 - 2c_{2\theta}^2(\vec{c}_S \cdot \vec{c}_F) -$$

$$2s_{2\theta}^2(\vec{b}_S \cdot \vec{b}_F) + 2c_{2\theta}\vec{a} \cdot \vec{b} + 2c_{2\theta}\vec{a} \cdot \vec{c} + 2s_{2\theta}c_{2\theta}(\vec{b}_S \cdot \vec{c}_F + \vec{b}_F \cdot \vec{c}_S).$$

Differentiate, $$0 = s_{4\theta}(\vec{c}_S \cdot \vec{c}_F - \vec{b}_S \cdot \vec{b}_F) + c_{4\theta}(\vec{b}_S \cdot \vec{c}_F + \vec{b}_F \cdot \vec{c}_S) - s_{2\theta}\vec{a} \cdot \vec{b} + c_{2\theta}\vec{a} \cdot \vec{c} =$$

$$2s_{2\theta}c_{2\theta}(\vec{c}_S \cdot \vec{c}_F - \vec{b}_S \cdot \vec{b}_F) + (2c_{2\theta}^2 - 1)(\vec{b}_S \cdot \vec{c}_F + \vec{b}_F \cdot \vec{c}_S) -$$

$$s_{2\theta}\vec{a} \cdot \vec{b} + c_{2\theta}\vec{a} \cdot \vec{c} = s_{2\theta}[2c_{2\theta}(\vec{c}_S \cdot \vec{c}_F - \vec{b}_S \cdot \vec{b}_F) - \vec{a} \cdot \vec{b}] +$$

$$(2c_{2\theta}^2 - 1)(\vec{b}_S \cdot \vec{c}_F + \vec{b}_F \cdot \vec{c}_S) + c_{2\theta}\vec{a} \cdot \vec{c}.$$

Square, $$s_{2\theta}^2\left[2c_{2\theta}(\vec{c}_S\cdot\vec{c}_F - \vec{b}_S\cdot\vec{b}_F) - \vec{a}\cdot\vec{b}\right]^2 = \left[(2c_{2\theta}^2 - 1)(\vec{b}_S\cdot\vec{c}_F + \vec{b}_F\cdot\vec{c}_S) + c_{2\theta}\vec{a}\cdot\vec{c}\right]^2.$$

Rearrange $$0 = (c_{2\theta}^2 - 1)\left[2c_{2\theta}(\vec{c}_S\cdot\vec{c}_F - \vec{b}_S\cdot\vec{b}_F) - \vec{a}\cdot\vec{b}\right]^2 +$$
$$\left[(2c_{2\theta}^2 - 1)(\vec{b}_S\cdot\vec{c}_F + \vec{b}_F\cdot\vec{c}_S) + c_{2\theta}\vec{a}\cdot\vec{c}\right]^2 =$$
$$4\left((\vec{c}_S\cdot\vec{c}_F - \vec{b}_S\cdot\vec{b}_F)^2 + (\vec{b}_S\cdot\vec{c}_F + \vec{b}_F\cdot\vec{c}_S)^2\right)c_{2\theta}^4 +$$
$$4\left((\vec{b}_S\cdot\vec{c}_F + \vec{b}_F\cdot\vec{c}_S)(\vec{a}\cdot\vec{c}) - (\vec{c}_S\cdot\vec{c}_F - \vec{b}_S\cdot\vec{b}_F)(\vec{a}\cdot\vec{b})\right)c_{2\theta}^3 +$$
$$\left((\vec{a}\cdot\vec{b})^2 + (\vec{a}\cdot\vec{c})^2 - 4\left((\vec{c}_S\cdot\vec{c}_F - \vec{b}_S\cdot\vec{b}_F)^2 + (\vec{b}_S\cdot\vec{c}_F + \vec{b}_F\cdot\vec{c}_S)^2\right)\right)c_{2\theta}^2 +$$
$$\left(4(\vec{c}_S\cdot\vec{c}_F - \vec{b}_S\cdot\vec{b}_F)(\vec{a}\cdot\vec{b}) - 2(\vec{b}_S\cdot\vec{c}_F + \vec{b}_F\cdot\vec{c}_S)(\vec{a}\cdot\vec{c})\right)c_{2\theta} +$$
$$\left((\vec{b}_S\cdot\vec{c}_F + \vec{b}_F\cdot\vec{c}_S)^2 - (\vec{a}\cdot\vec{b})^2\right).$$

Using the apparatus, systems, and methods disclosed herein, those in the petroleum recovery industry and other industries may now be able to more accurately and rapidly assess the properties of geologic formations, including stress induced anisotropy. Increased operational efficiency and client satisfaction may result.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An apparatus comprising:
a tool having a longitudinal axis;
a transmitter ring attached to the tool, the transmitter ring having orthogonal dipole transmitters;
a number of receiver rings, each receiver ring disposed along a length of the longitudinal axis at a different distance from the other receiver rings along the length, each receiver ring having a plurality of acoustic dipole receivers azimuthally disposed around the tool;
recording logic to record a plurality of acoustic waveforms corresponding to acoustic waves received at the acoustic dipole receivers when the tool is operated in a geological formation, the acoustic waves being generated by the orthogonal dipole transmitters; and
a signal processor to generate an objective function, based on ordered sets of the plurality of acoustic waveforms received at each receiver ring, with respect to an azimuth angle, wherein the azimuth angle corresponds to an orientation of the orthogonal dipole transmitters and the acoustic dipole receivers relative to fast and slow principal flexural wave axes, with the signal processor structured to estimate a global minimum of the objective function with respect to the azimuth angle and to determine an anisotropy angle of the geological formation based on the global minimum.

2. The apparatus of claim 1, wherein the signal processor is structured to generate the objective function with respect to the azimuth angle and a set of auxiliary parameters.

3. The apparatus of claim 1, wherein the auxiliary parameters include fast and slow slowness values.

4. The apparatus of claim 1, wherein a receiver ring of the number of receiver rings has N dipole receivers and is operable to provide N(N−1)/2 independent 2×2 waveforms, N being an integer greater than two.

5. The apparatus of claim 1, wherein the signal processor is structured to diagonalize independent 2×2 waveforms, each independent 2×2 waveform being in-line and cross-line components according to two azimuth indices, the two azimuth indices not equal to each other, each azimuth index correlated to a different one of the acoustic dipole receivers of one of the receiver rings.

6. The apparatus of claim 1, wherein the signal processor is structured to remove existing ambiguities associated with the fast and slow principal flexural wave axes and/or objective function minima and maxima.

7. The apparatus of claim 1, wherein the tool comprises one of a wireline tool or a measurement while drilling tool.

8. A processor-implemented method of estimating an azimuth angle, executed by one or more processors that perform the method, the method comprising:
recording a plurality of acoustic waveforms corresponding to acoustic waves received at a number of receiver rings, each receiver ring disposed along a length of a longitudinal axis of a tool at a different distance from the other receiver rings along the length of the longitudinal axis, the tool surrounded by a geological formation, each receiver ring having a plurality of acoustic dipole receivers azimuthally disposed around the tool and receiving acoustic waves, the acoustic waves being generated by orthogonal dipole transmitters in a transmitter ring attached to the tool;
generating an objective function, based on ordered sets of the plurality of acoustic waveforms received at each receiver ring, with respect to an azimuth angle, wherein the azimuth angle corresponds to an orientation of the orthogonal dipole transmitters and the acoustic dipole receivers relative to fast and slow principal flexural wave axes;
estimating a global minimum of the objective function with respect to the azimuth angle; and
determining an anisotropy angle of the geological formation based on the global minimum.

9. The processor-implemented method of claim 8, wherein the method includes forming the ordered sets of the plurality of acoustic waveforms from a receiver ring of the number of receiver rings having N dipole receivers providing N(N−1)/2 independent 2×2 waveforms, N being an integer greater than two.

10. The processor-implemented method of claim 8, wherein the method includes diagonalizing independent 2×2 waveforms, each independent 2×2 waveform being in-line and cross-line components according to two azimuth indices, the two azimuth indices not equal to each other, each azimuth index correlated to a different one of the acoustic dipole receivers of one of the receiver rings.

11. The processor-implemented method of claim 8, wherein generating the objective function includes extending a first objective function to include generalized waveforms correlated to the plurality of acoustic dipole receivers azimuthally disposed around the tool in each ring, the first objective function generated with respect to in-line and cross-line waveforms from transmitter rings to receiver rings, each transmitter ring having only two dipole transmitters orthogonal to each other and each receiver ring having only two dipole receivers orthogonal to each other.

12. The processor-implemented method of claim 8, wherein estimating a global minimum of the objective function is accomplished analytically or by using a numerical search algorithm.

13. The processor-implemented method of claim 8, wherein determining the anisotropy angle of the geological formation includes implementing the generating, the estimating, and the determining for a data point space defined over multiple frequency bands having different starting frequencies or by multiple different time periods having different starting times.

14. The processor-implemented method of claim 8, wherein the method includes removing existing ambiguities associated with the fast and slow principal flexural wave axes and/or objective function minima and maxima.

15. The processor-implemented method of claim 14, wherein removing existing objective function minimum/maximum ambiguity includes substituting the azimuth angle into the objective function and substituting an ambiguous angle into the objective function, and selecting an angle that minimizes the objective function.

16. The processor-implemented method of claim 14, wherein removing existing fast slow principal axis ambiguity includes either
constraining auxiliary parameters a priori to eliminate the ambiguity before minimizing the objective function; or
eigenvalue alignment a priori to eliminate the ambiguity before minimizing the objective function; or
rotating cross-dipole waveforms of the ordered sets of the plurality of acoustic waveforms by min/max ambiguity resolved azimuth angle into the fast and slow waveforms and comparing slowness of the cross-dipole waveforms using either a time semblance algorithm or frequency semblance algorithm.

17. A non-transitory machine-readable storage device having instructions stored thereon, which, when performed by a machine, cause the machine to perform operations, the operations comprising:
recording a plurality of acoustic waveforms corresponding to acoustic waves received at a number of receiver rings, each receiver ring disposed along a length of a longitudinal axis of a tool at a different distance from the other receiver rings along the length of the longitudinal axis, the tool surrounded by a geological formation, each receiver ring having a plurality of acoustic dipole receivers azimuthally disposed around the tool and receiving acoustic waves, the acoustic waves being generated by orthogonal dipole transmitters in a transmitter ring attached to the tool;
generating an objective function, based on ordered sets of the plurality of acoustic waveforms received at each receiver ring, with respect to an azimuth angle, wherein the azimuth angle corresponds to an orientation of the orthogonal dipole transmitters and the acoustic dipole receivers relative to fast and slow principal flexural wave axes;
estimating a global minimum of the objective function with respect to the azimuth angle; and
determining an anisotropy angle of the geological formation based on the global minimum.

18. The non-transitory machine-readable storage device of claim 17, wherein generating the objective function includes generating the objective function with respect to the azimuth angle and a set of auxiliary parameters.

19. The non-transitory machine-readable storage device of claim 18, wherein the auxiliary parameters include fast and slow slowness values.

20. The non-transitory machine-readable storage device of claim 17, wherein the instructions include instructions to form the ordered sets of the plurality of acoustic waveforms from a receiver ring of the number of receiver rings having N dipole receivers providing N(N−1)/2 independent 2×2 waveforms, N being an integer greater than two.

21. The non-transitory machine-readable storage device of claim 17, wherein the instructions include instructions to diagonalize independent 2×2 waveforms, each independent 2×2 waveform being in-line and cross-line components according to two azimuth indices, the two azimuth indices not equal to each other, each azimuth index correlated to a different one of the acoustic dipole receivers of one of the receiver rings.

22. The non-transitory machine-readable storage device of claim 17, whereingenerating the objective function includes extending a first objective function to include generalized waveforms correlated to the plurality of acoustic dipole receivers azimuthally disposed around the tool in each ring, the first objective function generated with respect to in-line and cross-line waveforms from transmitter rings to receiver rings, each transmitter ring having only two dipole transmitters orthogonal to each other and each receiver ring having only two dipole receivers orthogonal to each other.

* * * * *